(12) United States Patent
Brooks et al.

(10) Patent No.: US 12,487,569 B2
(45) Date of Patent: Dec. 2, 2025

(54) METHOD OF PERFORMING A PROCESS AND OPTIMIZING CONTROL SIGNALS USED IN THE PROCESS

(71) Applicant: 3M INNOVATIVE PROPERTIES COMPANY, St. Paul, MN (US)

(72) Inventors: Brian E. Brooks, St. Paul, MN (US); Gilles J. Benoit, Minneapolis, MN (US); Peter O. Olson, Andover, MN (US); Tyler W. Olson, Woodbury, MN (US); Himanshu Nayar, St. Paul, MN (US); Frederick J. Arsenault, Stillwater, MN (US); Nicholas A. Johnson, Woodbury, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 293 days.

(21) Appl. No.: 17/433,069

(22) PCT Filed: Sep. 11, 2019

(86) PCT No.: PCT/IB2019/057648
§ 371 (c)(1),
(2) Date: Aug. 23, 2021

(87) PCT Pub. No.: WO2020/188328
PCT Pub. Date: Sep. 24, 2020

(65) Prior Publication Data
US 2022/0155733 A1    May 19, 2022

Related U.S. Application Data

(60) Provisional application No. 62/818,816, filed on Mar. 15, 2019.

(51) Int. Cl.
G05B 13/04    (2006.01)
B60W 40/064    (2012.01)
(Continued)

(52) U.S. Cl.
CPC ......... G05B 13/042 (2013.01); B60W 40/064 (2013.01); B60W 40/08 (2013.01);
(Continued)

(58) Field of Classification Search
CPC . G05B 13/042; G05B 13/0265; G05B 13/041
See application file for complete search history.

(56) References Cited

U.S. PATENT DOCUMENTS

| | | |
|---|---|---|
| 5,196,997 A | 3/1993 | Kurtzberg |
| 5,882,774 A | 3/1999 | Jonza |

(Continued)

FOREIGN PATENT DOCUMENTS

| | | |
|---|---|---|
| CA | 2977272 | 2/2018 |
| CN | 108710289 | 10/2018 |

(Continued)

OTHER PUBLICATIONS

Alvarez, "Introduction to Adaptive Experimental Design", Center for Quantitative Sciences, Vanberbilt University School of Medicine, Oct. 12, 2012, 96 pages.

(Continued)

Primary Examiner — Michael W Choi
(74) Attorney, Agent, or Firm — Bryan L. Walker; Sriram Srinivasan

(57) ABSTRACT

A method of performing a process using a plurality of control signals and resulting in a plurality of measurable outcomes is described. The method includes optimizing the plurality of control signals by at least: receiving a plurality of process constraints; receiving, for each measurable outcome, an optimum range; receiving, for each control signal, a plurality of potential optimum values; iteratively performing the process, where for each process iteration, the value of each control signal is selected from among the plurality of potential optimum values received for the control signal;

(Continued)

for each process iteration, measuring each outcome in the plurality of measurable outcomes; and generating confidence intervals for the control signals to determine a causal relationship between the control signals and the measurable outcomes. The method includes performing the process using at least the control signals determined by the causal relationship to causally affect at least one of the measurable outcomes.

15 Claims, 11 Drawing Sheets

(51) Int. Cl.
| | |
|---|---|
| B60W 40/08 | (2012.01) |
| B60W 40/105 | (2012.01) |
| G05B 13/02 | (2006.01) |
| G05B 19/4065 | (2006.01) |
| G05B 19/418 | (2006.01) |
| G05B 23/02 | (2006.01) |
| G06F 18/21 | (2023.01) |
| G06N 5/043 | (2023.01) |
| G06N 5/046 | (2023.01) |
| G06N 7/01 | (2023.01) |
| G06Q 10/0631 | (2023.01) |
| G06Q 10/0639 | (2023.01) |
| G06Q 30/0202 | (2023.01) |
| G06Q 10/087 | (2023.01) |

(52) U.S. Cl.
CPC ......... *B60W 40/105* (2013.01); *G05B 13/021* (2013.01); *G05B 13/024* (2013.01); *G05B 13/0265* (2013.01); *G05B 13/041* (2013.01); *G05B 19/4065* (2013.01); *G05B 19/41835* (2013.01); *G05B 23/0229* (2013.01); *G05B 23/0248* (2013.01); *G06F 18/2193* (2023.01); *G06N 5/043* (2013.01); *G06N 5/046* (2013.01); *G06N 7/01* (2023.01); *G06Q 10/06315* (2013.01); *G06Q 10/06395* (2013.01); *G06Q 30/0202* (2013.01); *G05B 2219/36301* (2013.01); *G06Q 10/087* (2013.01)

(56) References Cited

U.S. PATENT DOCUMENTS

| | | | |
|---|---|---|---|
| 5,976,424 A | 11/1999 | Weber | |
| 6,151,582 A | 11/2000 | Huang | |
| 6,266,853 B1 | 7/2001 | Ho | |
| 6,594,024 B1 | 7/2003 | Singh | |
| 6,952,688 B1 | 10/2005 | Goldman | |
| 7,461,040 B1 | 12/2008 | Goldman | |
| 7,680,752 B1 | 3/2010 | Clune, III | |
| 9,679,258 B2 | 6/2017 | Mnih | |
| 9,947,018 B2 | 4/2018 | Brooks | |
| 10,133,983 B1 | 11/2018 | Chelian | |
| 10,190,792 B2 | 1/2019 | Jacobson | |
| 10,229,026 B1 | 3/2019 | Vijendra | |
| 10,628,733 B2 | 4/2020 | Schaul | |
| 11,113,605 B2 | 9/2021 | Czarnecki | |
| 2001/0047846 A1 | 12/2001 | Currens | |
| 2004/0099993 A1 | 5/2004 | Jackson | |
| 2004/0230397 A1 | 11/2004 | Chadwick | |
| 2006/0242288 A1 | 10/2006 | Masurkar | |
| 2006/0274244 A1 | 12/2006 | Battiato | |
| 2007/0031853 A1 | 2/2007 | Stanton | |
| 2007/0156294 A1 | 7/2007 | Tipping | |
| 2007/0156382 A1 | 7/2007 | Graham, II | |
| 2007/0219736 A1 | 9/2007 | Okita | |
| 2008/0121729 A1 | 5/2008 | Gray | |
| 2009/0006125 A1 | 1/2009 | Angell | |
| 2009/0204267 A1 | 8/2009 | Sustaeta | |
| 2010/0103521 A1 | 4/2010 | Smith | |
| 2010/0191361 A1 | 7/2010 | McCready | |
| 2010/0201242 A1 | 8/2010 | Liu | |
| 2010/0330155 A1 | 12/2010 | Berry | |
| 2011/0022193 A1 | 1/2011 | Panaitescu | |
| 2011/0112997 A1 | 5/2011 | Sabe | |
| 2012/0010867 A1 | 1/2012 | Eder | |
| 2013/0038939 A1 | 2/2013 | Walker, Jr. | |
| 2013/0197675 A1 | 8/2013 | McCarthy | |
| 2013/0197698 A1 | 8/2013 | Shah | |
| 2014/0025358 A1 | 1/2014 | Hill | |
| 2014/0289174 A1 | 9/2014 | Statnikov | |
| 2014/0379101 A1 | 12/2014 | Buchmann | |
| 2015/0142704 A1 | 5/2015 | London | |
| 2016/0041541 A1 | 2/2016 | Drees | |
| 2016/0147203 A1 | 5/2016 | Di Cairano | |
| 2016/0287693 A1 | 10/2016 | Norman | |
| 2016/0350796 A1 | 12/2016 | Arsenault | |
| 2017/0031354 A1 | 2/2017 | Tyber | |
| 2017/0050590 A1 | 2/2017 | List | |
| 2017/0102678 A1 | 4/2017 | Nixon | |
| 2017/0109642 A1 | 4/2017 | Kawale | |
| 2017/0206467 A1* | 7/2017 | Brooks | G06Q 50/06 |
| 2017/0278114 A1 | 9/2017 | Renders | |
| 2017/0359418 A1 | 12/2017 | Sustaeta | |
| 2018/0013320 A1* | 1/2018 | Brooks | H02J 3/00125 |
| 2018/0121817 A1 | 5/2018 | Datta | |
| 2018/0181808 A1 | 6/2018 | Sridharan | |
| 2018/0242429 A1 | 8/2018 | Ashdown | |
| 2018/0364657 A1 | 12/2018 | Luo | |
| 2019/0026754 A1 | 1/2019 | Miltonberger | |
| 2019/0078801 A1 | 3/2019 | Turney | |
| 2019/0244110 A1 | 8/2019 | Qiu | |
| 2020/0111018 A1* | 4/2020 | Golovin | G06F 17/11 |

FOREIGN PATENT DOCUMENTS

| | | |
|---|---|---|
| EP | 3316140 | 5/2018 |
| JP | 2006-277370 | 10/2006 |
| WO | WO 2005-124580 | 12/2005 |
| WO | WO 2012-151499 | 11/2012 |
| WO | WO 2013-130956 | 9/2013 |
| WO | WO 2016-086665 | 6/2016 |
| WO | WO 2020-109937 | 6/2020 |
| WO | WO 2020-188327 | 9/2020 |
| WO | WO 2020-188329 | 9/2020 |
| WO | WO 2020-188330 | 9/2020 |
| WO | WO 2020-188331 | 9/2020 |
| WO | WO 2020-188333 | 9/2020 |
| WO | WO 2020-188334 | 9/2020 |
| WO | WO 2020-188335 | 9/2020 |
| WO | WO 2020-188336 | 9/2020 |
| WO | WO 2020-188338 | 9/2020 |
| WO | WO 2020-188341 | 9/2020 |
| WO | WO 2020-190324 | 9/2020 |
| WO | WO 2020-190325 | 9/2020 |
| WO | WO 2020-190326 | 9/2020 |
| WO | WO 2020-190327 | 9/2020 |
| WO | WO 2020-190328 | 9/2020 |

OTHER PUBLICATIONS

Agrawal, "Analysis of Thompson Sampling for the Multi-armed Bandit Problem", Conference on Learning Theory, 2012, vol. 23, pp. 39.1-39.26.

Auer, "Finite-time Analysis of the Multiarmed Bandit Problem", Machine Learning, 2002, vol. 47, pp. 235-256.

Cao, "Nearly Optimal Adaptive Procedure with Change Detection for Piecewise-Stationary Bandit", International Conference on Artificial Intelligence and Statistics, 2019, vol. 89, 10 pages.

Cesa-Bianchi, "Boltzmann Exploration Done Right", Conference on Neural Information Processing Systems, 2017, pp. 1-10.

Gomes, "Machine-Learning Maestro Michael Jordon on the Delusions of Big Data and Other Huge Engineering Efforts", IEEE Spectrum, Oct. 2014, 10 pages.

(56) References Cited

OTHER PUBLICATIONS

Jordan, "Machine Learning: Trends, Perspectives, and Prospects", Journal of Science, Jul. 17, 2015, vol. 349, No. 6245, pp. 255-260.
Li, "A Contextual-Bandit Approach to Personalized News Article Recommendation", International World Wide Web Conference (WWW), 2010, pp. 661-670.
Li, "Knowledge Discovery from Observational Data for Process Control using Causal Bayesian Networks", IIE Transactions, 2007, vol. 39, pp. 681-690.
Pike-Burke, "Bandits with Delayed, Aggregated Anonymous Feedback", International Conference on Machine Learning, 2018, 9 pages.
Shi, "Quality Control and Improvement for Multistage Systems: A survey", IIE Transactions, 2009, vol. 41, No. 9, pp. 744-753.
International Search Report for PCT International Application No. PCT/IB2019/057646, mailed on Dec. 17, 2019, 4 pages.
International Search Report for PCT International Application No. PCT/IB2019/058423 mailed on Jan. 17, 2020, 3 pages.
International Search Report for PCT International Application No. PCT/IB2019/058426 mailed on, Jan. 17, 2020, 3 pages.
International Search Report for PCT International Application No. PCT/IB2019/058424 mailed on Jan. 17, 2020, 3 pages.
International Search Report for PCT International Application No. PCT/IB2019/057662 mailed on May 1, 2020, 3 pages.
International Search Report for PCT International Application No. PCT/IB2019/058438 mailed on Apr. 24, 2020, 3 pages.
International Search Report for PCT International Application No. PCT/US2019/050703 mailed on Dec. 4, 2019, 3 pages.
International Search Report for PCT International Application No. PCT/US2019/050695 mailed on Nov. 27, 2019, 3 pages.
International Search Report for PCT International Application No. PCT/IB2019/057648, mailed on Jan. 24, 2020, 7 pages.
International Search Report for PCT International Application No. PCT/IB2019/058428, mailed on Jan. 17, 2020, 3 pages.
International Search Report for PCT International Application No. PCT/IB2019/059227, mailed on Jan. 27, 2020, 3 pages.
International Search Report for PCT International Application No. PCT/IB2019/050701, mailed on Jan. 13, 2020, 5 pages.
International Search Report for PCT International Application No. PCT/IB2019/057664, mailed on May 4, 2020, 3 pages.
International Search Report for PCT International Application No. PCT/US2019/050699, mailed on Dec. 5, 2019, 3 pages.
International Search Report for PCT International Application No. PCT/US2019/050691, mailed on Dec. 11, 2019, 3 pages.
International Search Report for PCT International Application No. PCT/IB2019/057673, mailed on May 12, 2020, 2 pages.

\* cited by examiner

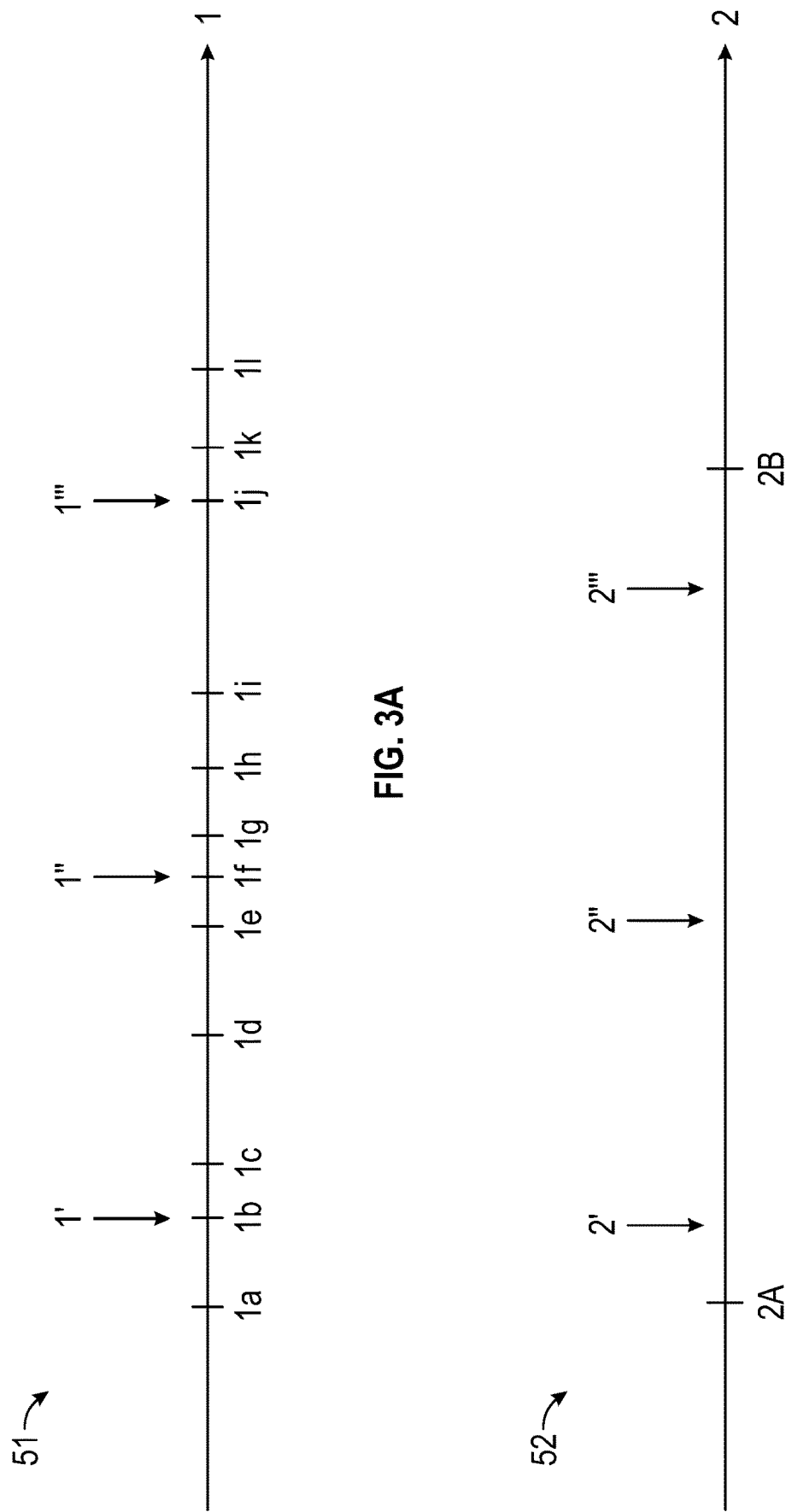

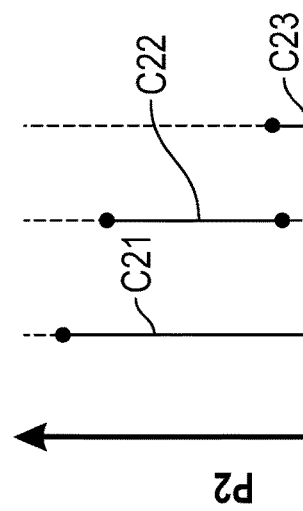
FIG. 8A
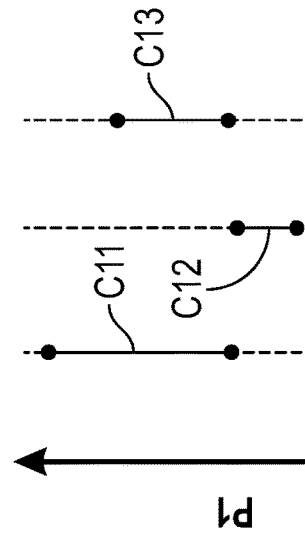
FIG. 8C
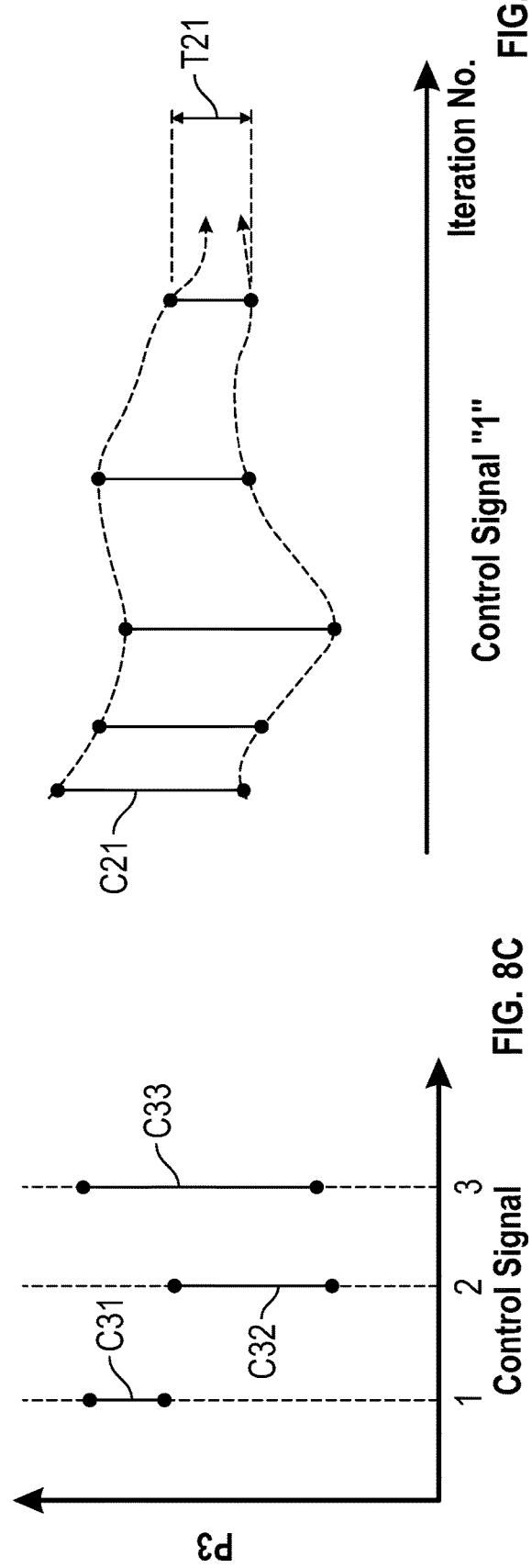
FIG. 8B
FIG. 9

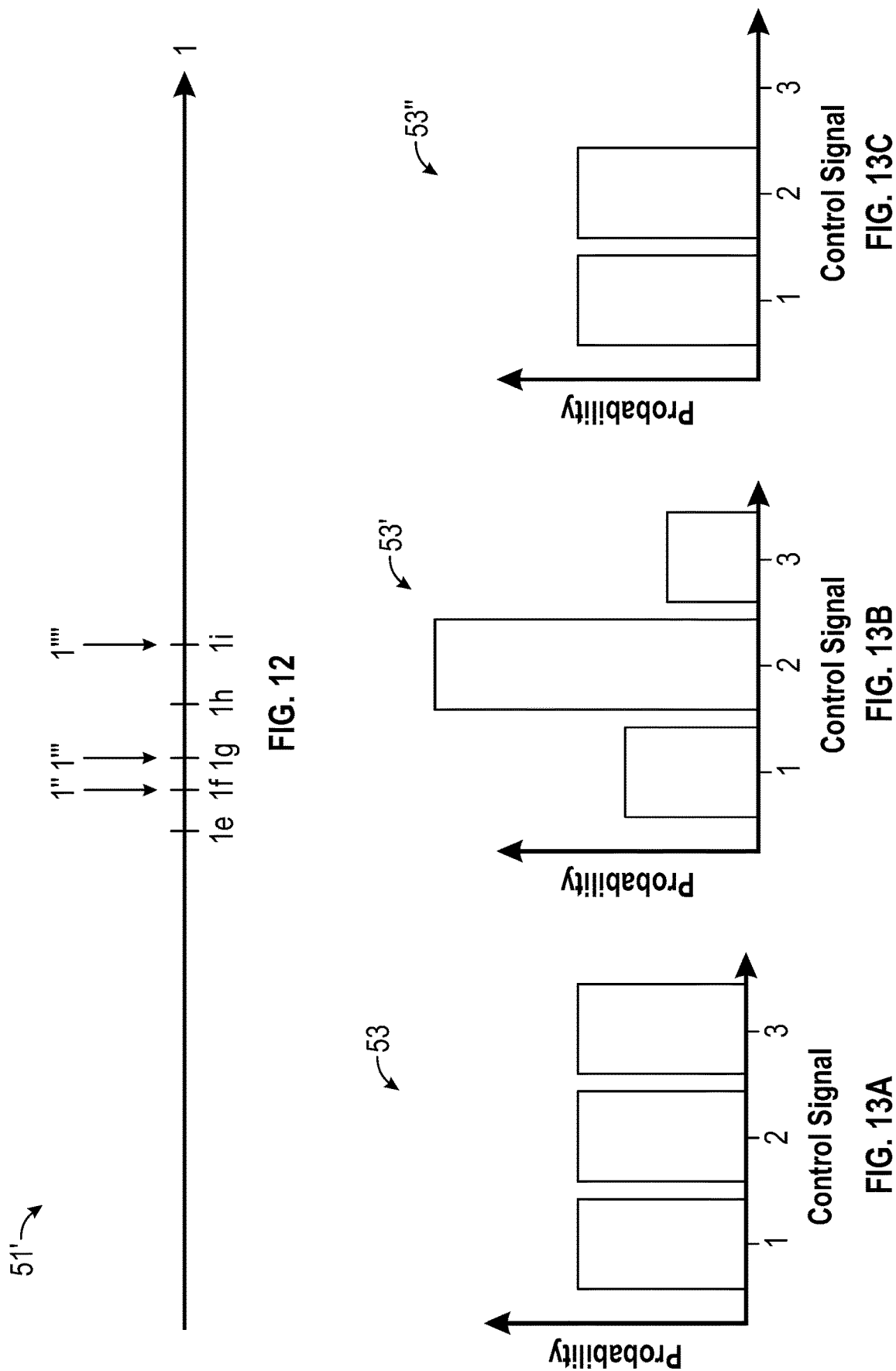

METHOD OF PERFORMING A PROCESS AND OPTIMIZING CONTROL SIGNALS USED IN THE PROCESS

BACKGROUND

Processes, such as manufacturing process, may utilize control systems that provide one or more control signals for controlling various aspects of the process to produce desired outcomes.

SUMMARY

In some aspects of the present description, a method of performing a process is provided. The process can use a plurality of control signals and result in a plurality of measurable outcomes. The method can include optimizing the plurality of control signals by at least: receiving a plurality of process constraints; receiving, for each measurable outcome, an optimum range; receiving, for each control signal, a plurality of potential optimum values; iteratively performing the process, where for each process iteration, the value of each control signal is selected from among the plurality of potential optimum values received for the control signal; for each process iteration, measuring each outcome in the plurality of measurable outcomes; and generating confidence intervals for the control signals to determine a causal relationship between the control signals and the measurable outcomes. The method can include performing the process using at least the control signals determined by the causal relationship to causally affect at least one of the measurable outcomes.

In some aspects of the present description, a method of performing a process is provided. The process can use a plurality of control signals and result in one or more measurable outcomes. The method can include determining optimum values for the plurality of control signals by at least: receiving a set of operating constraints; generating expected optimum values within an expected optimum operational range based on the received set of operating constraints; iteratively generating control signal values within corresponding operational ranges, such that for at least one iteration, at least one of the control signal values is different than the corresponding control signal value in a previous iteration, and at least one, but not all, of the control signal values is outside the operational range in a previous iteration; for each iteration, measuring values for the one or more measurable outcomes; and generating confidence intervals for the control signals to determine a causal relationship between the control signals and the one or more measurable outcomes. The method can include performing the process using the optimum values of at least the control signals determined by the causal relationship to causally affect at least one of the one or more measurable outcomes.

In some aspects of the present description, a method of performing a process is described. The process can use a plurality of control signals and result in one or more measurable outcomes. The method can include determining an optimum operational range for the plurality control signals operating and having corresponding values in the optimum operational range by at least: receiving a set of operating constraints; generating an expected optimum operational range for the control signals based on the received set of operating constraints, where the control signals are expected to operate and have corresponding values in the expected optimum operational range; generating a first operational range for the control signals operating and having corresponding values in the first operational range; quantifying a first gap between the first operational range and the expected optimum operational range; modifying at least one of the control signals operating in the first operational range to form a second operational range for the control signals operating and having corresponding values in the second operational range so that at least one, but not all, of the control signal values is outside the first operational range, and a second gap between the second operational range and the expected optimum operational range is less than the first gap; and generating confidence intervals for the control signals to determine a causal relationship between the control signals and the one or more measurable outcomes. The method can include performing the process using at least the control signals determined by the causal relationship to causally affect at least one of the one or more measurable outcomes.

In some aspects of the present description, a method of performing a process is described. The process can use a plurality of control signals and result in a plurality of measurable outcomes. The method can include optimizing the plurality of control signals by at least: for each control signal, selecting a plurality of potential optimum values from a predetermined set of potential optimum values for the control signal, and arranging the potential optimum values in a predetermined sequence; performing the process in at least a first sequence of operation iterations, where for each pair of sequential first and second operation iterations in the first sequence of operation iterations, the potential optimum value of one selected control signal in the first operation iteration is replaced in the second operation iteration with the next potential optimum value of the selected control signal in the corresponding predetermined sequence of the potential optimum values, while the potential optimum values of the remaining control signals in the first operation iteration are maintained in the second operation iteration; for each operation iteration in at least the first sequence of operation iterations, measuring each outcome in the plurality of measurable outcomes; and generating confidence intervals for the control signals to determine causal relationships between the control signals and the measurable outcomes. The method can include performing the process using at least the control signals determined by the causal relationship to causally affect at least one of the measurable outcomes.

In some aspects of the present description, a method of optimizing a plurality of control signals used in performing a process is provided. The process can result in a plurality of measurable outcomes. The method can include: receiving a plurality of process constraints; receiving, for each measurable outcome, an optimum range; receiving, for each control signal, a plurality of potential optimum values; iteratively performing the process, where for each process iteration, the value of each control signal is selected from among the plurality of potential optimum values received for the control signal; for each process iteration, measuring each outcome in the plurality of measurable outcomes; and generating confidence intervals for the control signals to determine a causal relationship between the control signals and the measurable outcomes.

In some aspects of the present description, a method of determining optimum values for a plurality of control signals operating within an optimum operational range is provided. The method can include: receiving a set of operating constraints; generating expected optimum values operating within an expected optimum operational range based on the received set of operating constraints; and iteratively generating control signal values operating within corresponding operational ranges, such that for at least one iteration, at least one of the control signal values is different than the corresponding control signal value in a previous iteration, and at least one, but not all, of the control signal values is outside the operational range in a previous iteration.

In some aspects of the present description, a method of determining an optimum operational range for a plurality control signals operating and having corresponding values in the optimum operational range is provided. The method can include: receiving a set of operating constraints; generating an expected optimum operational range for the control signals based on the received set of operating constraints, where the control signals are expected to operate and have corresponding values in the expected optimum operational range; generating a first operational range for the control signals operating and having corresponding values in the first operational range; quantifying a first gap between the first operational range and the expected optimum operational range; and modifying at least one of the control signals operating in the first operational range to form a second operational range for the control signals operating and having corresponding values in the second operational range so that at least one, but not all, of the control signal values is outside the first operational range, and a second gap between the second operational range and the expected optimum operational range is less than the first gap.

In some aspects of the present description, a method of optimizing a plurality of control signals used in performing a process where the process results in a plurality of measurable outcomes is provided. The method can include: for each control signal, selecting a plurality of potential optimum values from a predetermined set of potential optimum values for the control signal, and arranging the potential optimum values in a predetermined sequence; performing the process in at least a first sequence of operation iterations, where for each pair of sequential first and second operation iterations in the first sequence of operation iterations, the potential optimum value of one selected control signal in the first operation iteration is replaced in the second operation iteration with the next potential optimum value of the selected control signal in the corresponding predetermined sequence of the potential optimum values, while the potential optimum values of the remaining control signals in the first operation iteration are maintained in the second operation iteration; for each operation iteration in at least the first sequence of operation iterations, measuring each outcome in the plurality of measurable outcomes; and generating confidence intervals for the control signals to determine causal relationships between the control signals and the measurable outcomes.

BRIEF DESCRIPTION OF THE DRAWINGS

FIGS. 3A-3B are schematic illustrations of predetermined sets of potential optimum values of control signals;

FIGS. 8A-8C are schematic illustrations of confidence intervals for control signals;

FIG. 9 is a schematic illustration of a confidence interval for a control signal changing with iteration;

FIG. 12 is a schematic illustration of a subset of potential optimum values of a control signal;

FIGS. 13A-13C schematically illustrate distributions of control signals;

DETAILED DESCRIPTION

Figure 1:
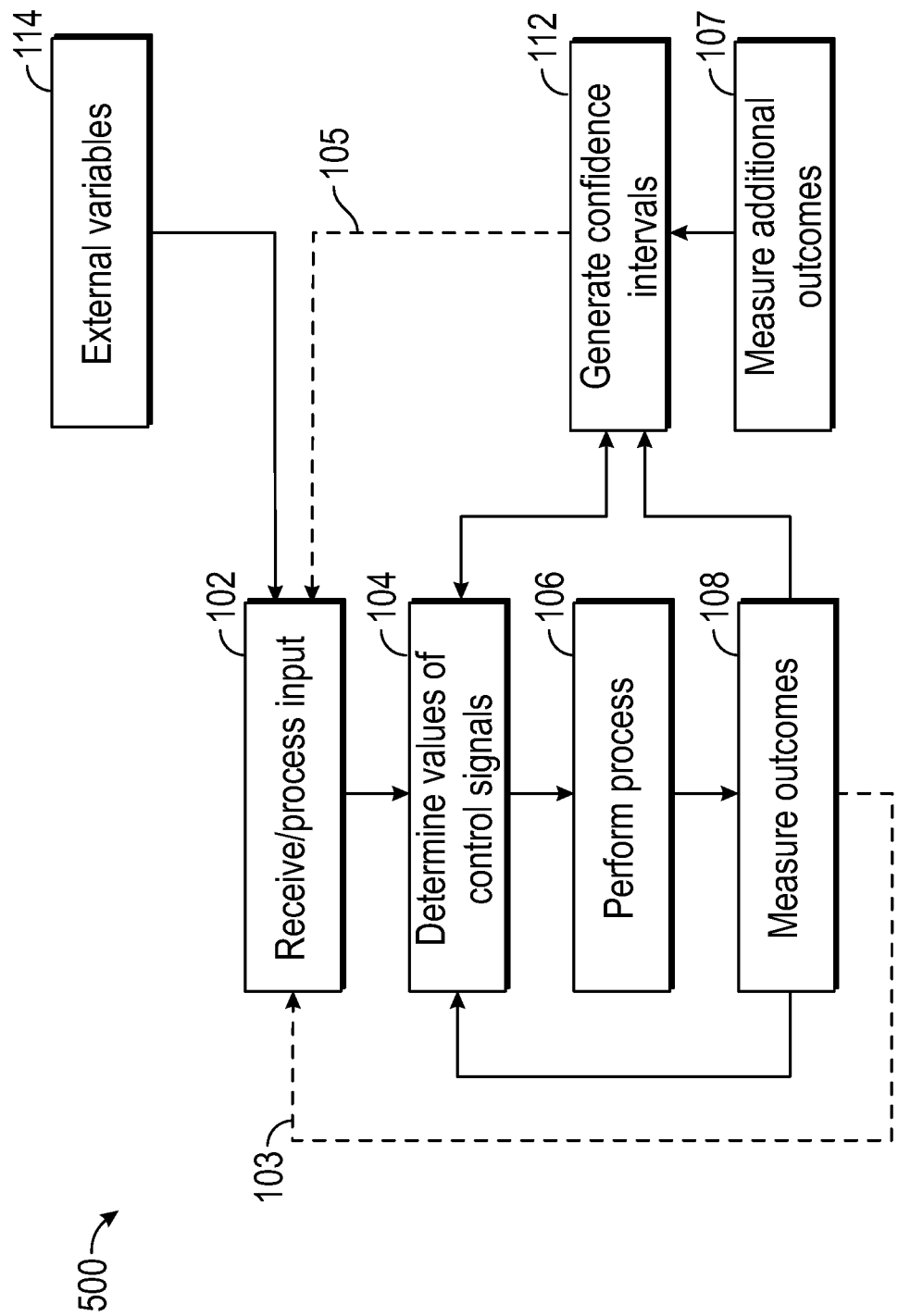
FIG. 1 is a flow diagram schematically illustrating a method of optimizing control signals.

In the following description, reference is made to the accompanying drawings that form a part hereof and in which various embodiments are shown by way of illustration. The drawings are not necessarily to scale. It is to be understood that other embodiments are contemplated and may be made without departing from the scope or spirit of the present description. The following detailed description, therefore, is not to be taken in a limiting sense.

The methods described herein can be applied to optimizing control signals for generating desired or optimum measurable outcomes for a wide variety of applications such as, for example, manufacturing process control, power grid control, battery management, ecommerce applications, management of displays, sensor applications, and facilities control. For example, in a display application, the control signals may be signals for controlling pixel driving schemes, and the measurable outcomes may include pixel lifetime. As another example, in a sensor application, the control signals may control calibration and/or interpretation of sensors in a sensor network, and the measurable outcomes may include a measure of accuracy of results from the network. The methods described herein can be applied to a wide variety of manufacturing processes, for example, including those described in U.S. Pat. Appl. Pub. Nos. 2001/0047846 (Currens et al.), 2004/0099993 (Jackson et al.), 2006/0274244 (Battiato et al.), 2010/0103521 (Smith et al.), 2010/0201242 (Liu et al.), 2013/0038939 (Walker, Jr. et al.), and in U.S. Pat. No. 5,882,774 (Jonza et al.) and U.S. Pat. No. 5,976,424 (Weber et al.), for example. As one illustrative manufacturing process example, the methods can be used to determine optimum control signals in a process for manufacturing film, such as brightness enhancement film. The control signals may control one or more of line speed, oven temperature, or viscosity (e.g., through material composition), for example, and the measurable outcomes may include one or more of an on-axis brightness gain provided by the brightness enhancement film, a defect density, and a prism pitch.

In some embodiments, a plurality of process or operating constraints is provided. For example, in a manufacturing process, the constraints may be suitable limits on line speed, processing temperature, and/or material composition. In some cases, the process or operating constraints are modified or updated while the method is carried out. The process may result in a plurality of measurable outcomes which may be denoted P1, P2, . . . Pn. For example, the measurable outcomes in the brightness enhancement film manufacturing example can include one or more of an on-axis brightness gain (P1), a defect density (P2), and a prism pitch (P3). In some embodiments, an optimum range is provided for each measurable outcome. An optimum range is a range of desired values of a measurable outcome. The optimum ranges may be denoted PV1, PV2, ... PVn where PVi corresponds to Pi. For example, an optimum range (PV1) for on axis brightness gain (P1) may be P1≥1.8, an optimum range (PV2) for defect density (P2) may be P2≤15 per $cm^2$, and an optimum range (PV3) for pitch (P3) may be 11.5 micrometers≤P3≤12.5 micrometers.

Methods according to some embodiments of the present description include determining a causal relationship between the control signals and the measurable outcomes. Causation can be measured as a statistically significant difference in measurable outcomes associated with changing a control signal while keeping all other control signals constant and blocking external variables/factors known or suspected to covary with the measurable outcomes. Differences in measurable outcomes can be computed and stored as d-scores, and assessment of the statistical significance can be accomplished by computing a confidence interval around the mean of each d-score distribution, which quantifies the expected value of the causal effect of the change in the control signal and the uncertainty surrounding it (and represents a measure or degree of inference precision). In some cases, determining a causal relationship between control signals and measurable outcomes includes determining that there is no statistically significant causal effect of at least one control signal on at least one measurable outcome, and may include determining for at least one other control signal and/or at least one other measurable outcome that there is a statistically significant causal effect of the control signal on the measurable outcome. In some embodiments, the method includes performing the process using at least the control signals determined by the causal relationship to causally affect at least one measurable outcome. The causal relationships can be maintained and updated as the method is carried out. In some embodiments, while updating the causal relationships, the method includes repeatedly selecting different values for control signals and measuring the effects of the different values on the measurable outcomes of the process. In some embodiments, the method includes generating or selecting values of control signals used in process iterations, where the control signal values generated or selected in later iterations depend, at least in part, on the causal relationships determined in prior iterations. In some embodiments, optimum values of the control signals are determined, at least in part, based on the confidence intervals. For example, the confidence intervals may indicate that a value of a control signal generates an optimum measured outcome within a range of values specified by the confidence interval.

Methods according to some embodiments include the ability to operate on impoverished input where conditions or interactions are initially unknown, incomplete, or hypothetical estimates and are learned over time through interpretation and adaptive use of confidence intervals, for example. Interpretation and adaptive use of the confidence intervals to automatically understand and exploit the effects of process decisions (changing control signals) allows for transparent and optimum regret management through probability matching, for example. In particular, the computation of confidence intervals can allow for risk-adjusted optimization since this can quantify the best and worst-case expected utility of the process decisions. Methods according to some embodiments can identify and adjust for false inputs (e.g., false assumptions) that would otherwise confound, bias and/or mask cause-and-effect knowledge and limit optimization results, as well as monitor and dynamically adapt to changes in causal relationships between control signals and measurable outcomes (e.g., as a result of equipment failure, wear and tear, raw material changes, or change in weather).

Some of the methods described herein are related to those described in U.S. Prov. Pat. Appl. No. 62/818,816 filed Mar. 15, 2019 and titled "Deep Causal Learning for Continuous Testing, Diagnosis, and Optimization".

FIG. 1 is a flow diagram schematically illustrating some embodiments of methods of the present description. The method 500 can include the step 102 of receiving input. The input received can include one or more of process constraint (s), an optimum range for each measurable outcome (e.g., a desired outcome), potential optimum values for each control signal (e.g., values of the control signals expected to achieve the optimum ranges and satisfy the process constraints), and, optionally, values of external variables 114 such as weather conditions. Step 102 can also include processing the received input. For example, the input may include a predetermined set of potential optimum values for each control signal, and step 102 may include, for each control signal, selecting a plurality of potential optimum values from the predetermined set for the control signal, and arranging the potential optimum values in a predetermined sequence. In some embodiments, at least some of the input information may be provided by, or updated by, one or more measurable parameters in the plurality of measurable parameters as schematically indicated by line 103 (e.g. an operator may adjust process constraints based on the measured outcomes to narrow or expand the search space). The measured outcomes (e.g., determined in steps 107 and/or 108) from one sequence of process iterations may be used as input information for a subsequent sequence of process iterations. In some embodiments, at least some of the input information may be updated based, at least in part, on the confidence intervals as schematically indicated by line 105. For example, one or more process constraint(s) and/or one or more sets of potential optimum values for the control signals may be updated as information on the causal relationships determined by the method 500 accumulate (e.g. a set of potential optimum values may be updated when the optimum value based on confidence intervals is found to be at the boundary of the current set or range).

The method 500 includes iteratively performing the steps 104, 106, and 108. In step 104, values of control signals are determined. In some embodiments, step 102 includes receiving a plurality of potential optimum values for each control signal and step 104 includes selecting (e.g., randomly, via Thompson sampling, or via probability matching) the value of each control signal from among the plurality of potential optimum values received for the control signal. In some embodiments, the plurality of potential optimum values is selected from a predetermined set of potential optimum values. In some embodiments, an operational range for the control signals is generated (e.g., based, at least in part, on a set of operating constraints received in step 102) and the values of the control signals are generated within the operational range. In step 106, the process that uses the control signals is performed (e.g., a manufacturing process which may use a plurality of control signals that control one or more of line speed, flow rate, or processing temperature, for example). In step 108, at least some of the measurable outcomes (e.g., defect density or performance attributes that can be measured in a continuous process) are determined. In some embodiments, other measurable outcomes (e.g., performance attributes that may not be readily determined in a continuous process) are measured after completion of iteratively performing the process. This is schematically illustrated as step 107 in FIG. 1 where additional outcomes are measured. In some embodiments, all of the measurable outcomes that are measured in the method 500 are measured in step 108 and step 107 is omitted. In other embodiments (e.g., a batch process), all of the measurable outcomes that are measured in the method are measured in step 107 and step 108 is omitted.

The method 500 includes the step 112 of generating confidence intervals, which can be determined from the history of measured outcomes and values of the control signals. The confidence intervals may be generated at every step, or may be generated only after a specified number of steps have been carried out, or may be initially generated after a specified number of steps have been carried out and then updated after every subsequent step or after every specified number of steps, or may be generated after completion of iteratively performing the process, for example. The confidence intervals can be used to determine a causal relationship between the control signals and the measurable outcomes and, when available, may be used in step 104 in determining the next values of the control signals. If additional measurable outcomes are measured in step 107 after completion of iteratively performing the process 106, these outcomes can be used in step 112 in generating or updating confidence intervals that may be utilized when the process is subsequently performed. Even when additional measurable outcomes are measured in step 107, confidence intervals for those measurable outcomes measured while iteratively performing the process can be determined prior to the completion of iteratively performing the process and may be used in making process decisions (e.g., in step 104). In some embodiments, the method 500 includes performing the process using at least the control signals determined by the causal relationship to causally affect at least one of the measurable outcomes. The values of the control signals used in this step can be the optimized values determined by the method. This step can be done after completion of iteratively performing the process in step 106 or can be one of the steps 106 performed while iteratively performing the process. For example, a sufficient number of iterations can be carried out to determine confidence intervals and an estimate for the optimum values of the control signals and then the step of performing the process using (e.g., the estimated optimum values of) at least the control signals determined by the causal relationship to causally affect at least one of the measurable outcomes can be the performed during the next iteration. The iterative process can continue after this step to further refine the estimate for the optimum values of the control signals and/or to adjust the optimum values in response to changing external variables, for example. In other embodiments, after completion of iteratively performing the process and after optional step 107 and after step 112 has been completed, the method 500 includes performing the process using at least the control signals determined by the causal relationship to causally affect at least one of the measurable outcomes.

The process steps 106 can be operated over a duration sufficient to allow causal effects between the control signals and the measured outcomes to be determined. In some embodiments, the duration of the steps 106 varies as the process is iteratively performed. In some embodiments, the duration of a step 106 is determined based, at least in part, on the previously determined causal relationships. In some embodiments, the duration may vary with the control signal values (e.g. in the case of line speed). In some embodiments, one or more of the control signals may determine a set of protocols for measuring the outcomes, which may include different durations or locations (e.g. when there is uncertainty about the length of time it takes for effects to propagate in space and time).

In some embodiments, the method 500 includes receiving values, or measuring values, for external variables 114. For example, the external variables 114 can include weather data. In some embodiments, the method includes determining if d-scores correlate with the external variables 114. If the d-score distributions are determined to correlate with the external variables 114, then confidence intervals can be determined for different ranges of the external variables (e.g., different temperature ranges and/or different humidity ranges). This can reduce or eliminate bias in the cause and effect estimates that would result from these uncontrolled external variables, and can help improve the precision and accuracy of the causal model (the confidence intervals) and allows more granular contextual process control.

Figure 2:
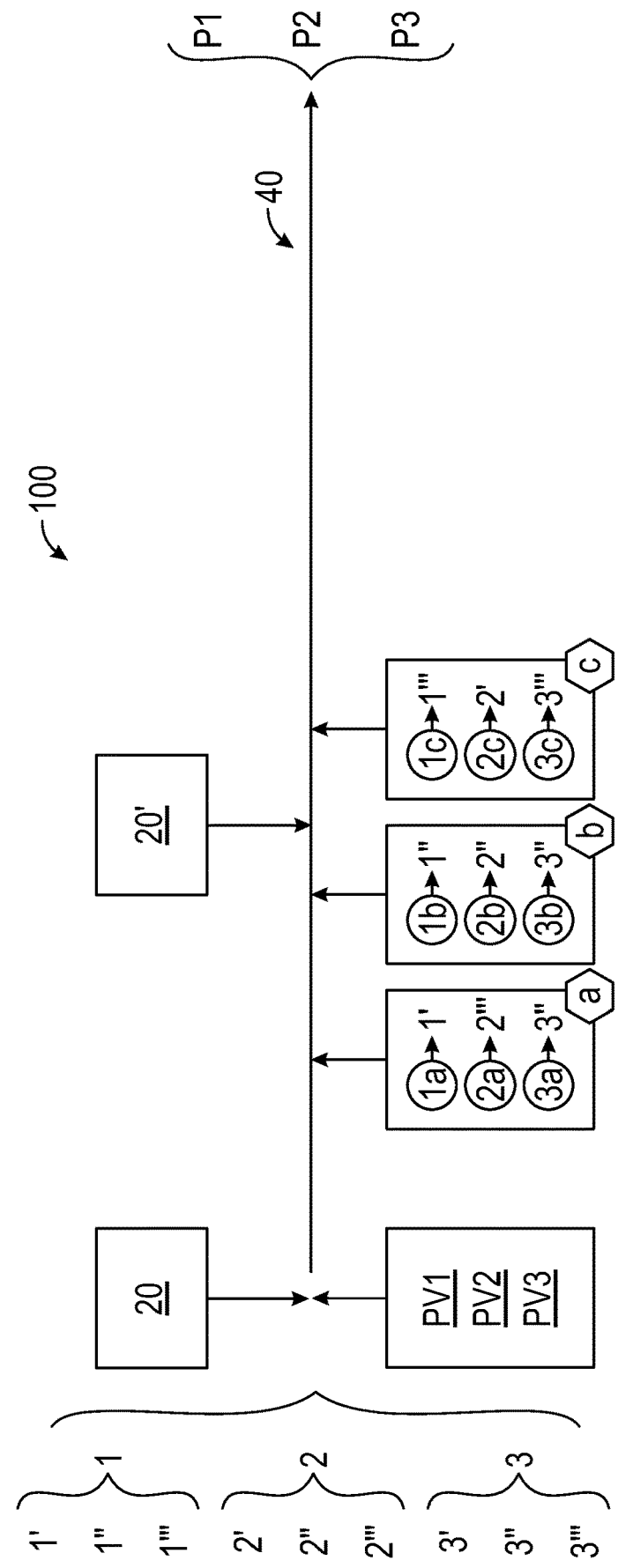
FIG. 2 is a schematic illustration of a method of optimizing control signals.

FIG. 2 is a schematic illustration of a method 100 of performing a process 40. The process uses a plurality of control signals (denoted 1, 2, and 3) and results in a plurality of measurable outcomes (P1-P3). The method 100 includes optimizing the plurality of control signals (e.g., generating estimates for optimum values for the control signals) where optimizing the control signals includes: receiving a plurality of process constraints 20; receiving, for each measurable outcome, an optimum range (PV1-PV3); receiving, for each control signal (1-3), a plurality of potential optimum values (1'-1''', 2'-2''', 3'-3'''); and iteratively (a-c) performing the process. In some embodiments, the plurality of potential optimum values is expected (e.g., based on information available at the time the potential optimum values are received or updated) to be consistent with the process constraints and with each measurable outcome being in the optimum range for the measurable outcome. In some embodiments, constraints can be defined not just for individual control signals but also combinatorics of control signals. In some embodiments, there may be interactions between the control signals such that the optimality of a control signal value is contingent on the values of other control signals. A potential optimum value of a control signal is expected to be consistent with the process constraints if the process constraints are expected to be satisfied when the control signal has the potential optimum value, for at least some values of the other control signals. Similarly, a potential optimum value of a control signal is expected to be consistent with each measurable outcome being in the optimum range for the measurable outcome if each measurable outcome is expected to be in the corresponding optimum range when the control signal has the potential optimum value, for at least some values of the other control signals.

In some embodiments, for each process iteration, the value of each control signal is selected from among the plurality of potential optimum values received for the control signal. In some embodiments, for each process iteration, the value of each control signal is randomly selected (e.g., randomly selected based on a uniform, Poisson, Gaussian, binomial, or any other distribution) from among the plurality of potential optimum values received for the control signal. As schematically illustrated in FIGS. 3A-3B, in some embodiments, the potential optimum values (e.g., 1', 1", 1''') for each control signal (e.g., control signal 1) are selected (e.g., randomly, or such as to maximize a distance between the selected potential optimum values) from a predetermined set 51, 52 of potential optimum values (e.g., 1a-1l) for the control signal. As schematically illustrated in FIG. 3B, in some embodiments, for at least one control signal (e.g., control signal 2), the set 52 of potential optimum values is a continuous set (a range of 2A to 2B). In the case of a continuous set, discrete potential optimum values may be selected uniformly or randomly from the set. Alternatively, the continuous range can be divided into subranges and a value can be randomly sampled from each subrange, for example.

The predetermined set (e.g., 51) of potential optimum values (e.g., 1*a*-1*l*) for the control signal may be such that the optimum ranges (e.g., PV1-PV3) are expected to result from control signals selected from the predetermined set and/or such that the process constraints are expected to be satisfied when control signals are selected from the predetermined set. In some embodiments, for at least one process iteration, the value of at least one control signal is selected (e.g., randomly) from a subset (e.g., the subset 1', 1") of the plurality of potential optimum values received for the control signal and/or stored values of the confidence intervals. In some embodiments, the subset is selected based, at least in part, on stored values of the measurable outcomes and/or stored values of the confidence intervals. In some embodiments, while performing the process, for at least one control signal, the plurality of potential optimum values is changed (see, e.g., FIG. 10). The change may be based, at least in part, on stored values of the measurable outcomes and/or stored values of the confidence intervals. In some embodiments, for at least some process iterations, the value of each control signal is selected from among the plurality of potential optimum values received for the control signal based, at least in part, on stored values of the measurable outcomes and/or stored values of the confidence intervals (e.g., the value of the control signal can be selected from the potential optimum values based on a distribution determined, at least in part, from the confidence intervals).

In some embodiments, while iteratively performing the process, at least one constraint in the plurality of process constraints is modified (as schematically indicated by modified process constraints 20' in FIG. 2). For example, the method may determine that the optimum values of the control signals are outside the initial plurality of process constraints (e.g., by determining that the measurable outcomes improve as a boundary of the process constraints is approached) and that one or more constraints can be relaxed (while possibly tightening one or more other constraints in, some cases) while still satisfying the received optimum ranges for the measurable outcomes. The modification of the at least one constraint can be carried out manually (e.g., a human supervisor) or automatically (e.g., an artificial intelligence agent). For example, if the method determines that optimal values of control signals are approaching a boundary of a search space defined by the constraints, the method can include seeking authorization (e.g., from a supervisor, a system administrator, or other user of a system implementing the method) to alter the constraints in order to expand the space of possible values for the control signals.

The method 100 further includes, for each process iteration, measuring each outcome in the plurality of measurable outcomes. In some embodiments, at least one measurable outcome (e.g., P3) is measured while iteratively performing the process; and at least one other measurable outcome (e.g., P1) is measured after a completion of iteratively performing the process. For example, a pitch may be measured while iteratively performing the process (e.g., in real time), while an on-axis brightness gain may be measured after completion of iteratively performing the process (e.g., after collecting samples for each iteration and then measuring the brightness gains for the samples in a device).

Figure 4A:
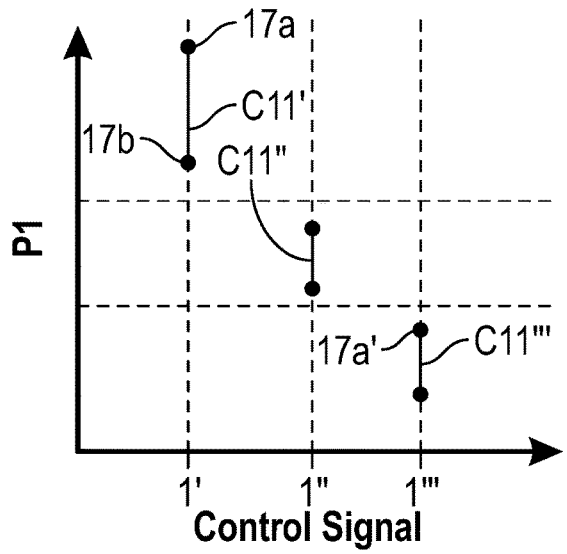
FIGS. 4A-4C are schematic illustrations of confidence intervals for a control signal.
Figure 4B:
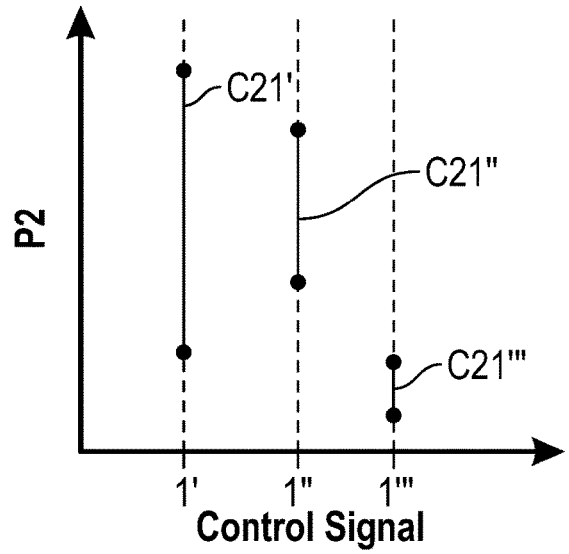
Figure 4C:
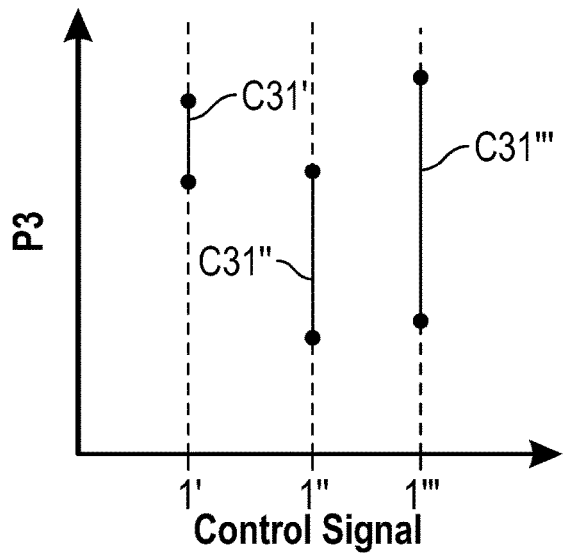

The method 100 can further include generating confidence intervals for the control signals to determine a causal relationship between the control signals and the measurable outcomes. FIGS. 4A-4C schematically illustrate confidence intervals C11'-C11''', C21'-C21''', and C31'-C31''', respectively, for control signal 1. Cmn is the confidence interval for measurable outcome Pm when control signal n has a given value, which can be, for example, a specified value (e.g., 1', 1", or 1''') or a value from the most recent iteration. For example, C21" is the confidence interval for measurable outcome P2 when control signal 1 takes the value 1". The confidence intervals may be determined for a specified confidence level. For example, the method can include performing a t-test or other statistical hypothesis test to construct a p % confidence interval, where p is a fixed value, e.g., 90%, or 95%, or 97.5%, or 99%.

Generating confidence intervals for the control signals to determine a causal relationship between the control signals and the measurable outcomes can include generating a confidence interval for at least one measurable outcome for at least some potential optimum values of the control signals. For example, a causal relationship between control signals 1, 2, and 3 and measurable outcomes P1, P2, and P3 may be that changing control signal 1 from a specified potential optimum value by one unit causes a change in P1 within a first confidence interval and changing control signal 2 from a specified potential optimum value by one unit causes a change in P1 within a second confidence interval. In some embodiments, generating the confidence intervals for the control signals includes generating a confidence interval for each potential optimum value (e.g., 1', 1", 1''') of each control signal (e.g., control signal 1) to determine a causal relationship between the potential optimum value of the control signal and each measurable outcome (e.g., P1, P2, P3). In some embodiments, the method 100 includes performing the process using at least the control signals determined by the causal relationship to causally affect at least one measurable outcome (e.g., using optimized values of the control signals determined by the process).

In some embodiments, each confidence interval (e.g., C11') includes upper and lower bounds 17*a* and 17*b*, and if for a control signal (e.g., control signal 1) in the plurality of control signals, the confidence intervals (e.g., C11', C11", C11''') for the potential optimum values (e.g., 1', 1", 1''') of the control signal are non-overlapping, then the optimum value for the control signal is selected as the potential optimum value (e.g., 1') of the control signal that corresponds to the confidence interval (e.g., C11') having the highest lower bound 17*b*. For example, it may be desired to maximize the measurable outcome characterized by the confidence interval.

In some embodiments, each confidence interval (e.g., C11') includes upper and lower bounds (e.g., 17*a* and 17*b*), and if for a control signal (e.g., control signal 1) in the plurality of control signals, the confidence intervals (e.g., C11', C11", C11''') for the potential optimum values (e.g., 1', 1", 1''') of the control signal are non-overlapping, then the optimum value for the control signal is selected as the potential optimum value (e.g., 1''') of the control signal that corresponds to the confidence interval (e.g., C11''') having the lowest higher bound 17*a*'. For example, it may be desired to minimize the measurable outcome characterized by the confidence interval.

In some embodiments, if for a control signal (e.g., control signal 1) in the plurality of control signals, the confidence intervals (e.g., C31', C31", C31''') for the potential optimum values (e.g., 1', 1", 1''') of the control signal are overlapping, then the optimum value for the control signal is selected as any of the potential optimum values (e.g., $1'$, $1''$, $1'''$) of the control signal. The control signal may be randomly selected from the potential optimum values, or may be selected based on any suitable sampling algorithm for choosing the optimum value. In some embodiments, if for a control signal in the plurality of control signals, the confidence intervals for the potential optimum values of the control signal are overlapping, then the optimum value for the control signal is selected by Thompson sampling or probability matching from the potential optimum values of the control signal. Thompson sampling and probability matching are known in the art and are described, for example, in U.S. Pat. Publ. Nos. 2017/0278114 (Renders), 2017/0109642 (Kawale et al.), 2019/0244110 (Qiu et al.), and U.S. Pat. No. 10,133,983 (Chelian et al.).

Figure 10:
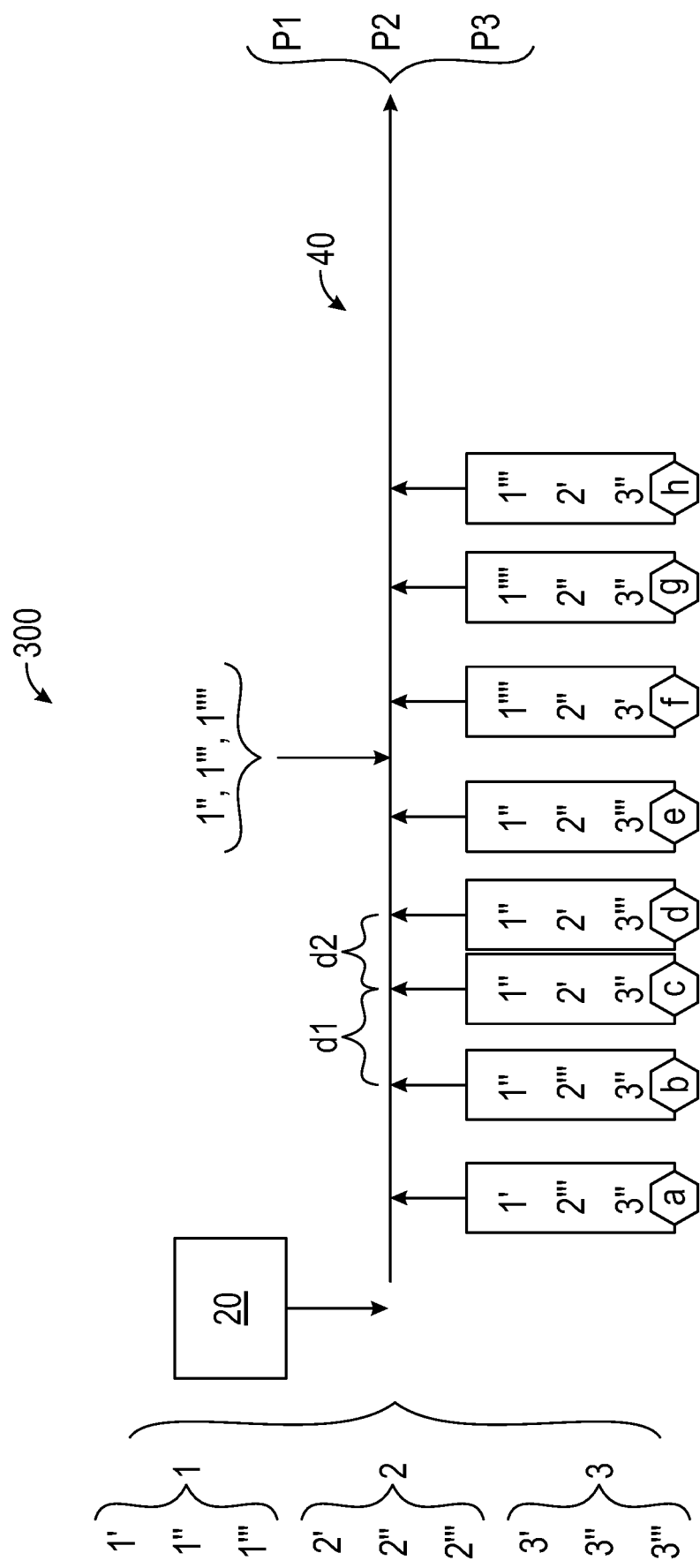
FIGS. 10-11 are schematic illustrations of methods of optimizing a plurality of control signals.

The duration of the process iterations can vary as the method is carried out (see, e.g., FIG. 10). In some embodiments of the method 100, a duration of at least one later operation iteration is determined based, at least in part, on measurable outcomes measured in at least one earlier operation iteration and/or on values of the confidence intervals. In some embodiments, the duration is specified by a control signal. In some embodiments, multiple durations can be measured within the same iteration. For example, when characterizing the dynamic nature of the causal effect, each measurable outcome can be measured at different durations and locations to understand how the effect propagates through the system in space and time.

Figure 5:
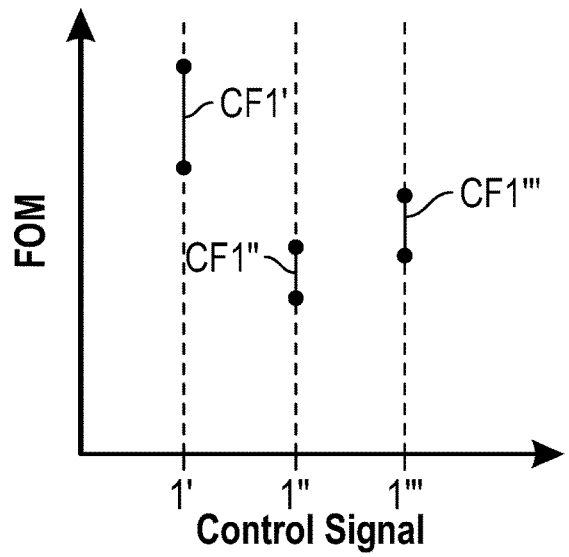
FIG. 5 is a schematic illustration of confidence intervals of a figure of merit for a control signal.
Figure 6:
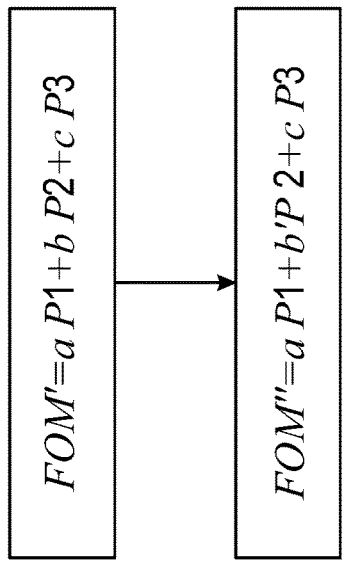
FIG. 6 is a schematic illustration of a change in weights used in figures of merit.

FIG. 5 schematically illustrates confidence intervals for a figure of merit (FOM) which is a function of the measurable outcomes. CFn is the confidence interval for the FOM when the control signal n has a given value. Confidence intervals CFn can be determined for each control signal. In some embodiments, generating the confidence intervals for the control signals includes defining a figure of merit as a function of the measurable outcomes, and generating a confidence interval (e.g., $CF1'$) for the control signals to determine a causal relationship between the control signals and the figure of merit. In some embodiments, the FOM can further include soft constraints. For example, if a measurable outcome should be greater than 1.2, then a continuous penalty function could be included where the penalty increases exponentially as the measurable outcome falls further below 1.2. In some embodiments, generating the confidence intervals for the control signals includes generating a confidence interval CFn for each potential optimum value of each control signal n. In some embodiments, the figure of merit is or includes a weighted function of the measurable outcomes where the weighted function assigns a predetermined weight to each measurable outcome. For example, the FOM may be defined as a P1+b P2+c P3, as indicated in FIG. 6, where each of the values a, b, and c are predetermined weights. In some embodiments, the FOM is a nonlinear function of the measurable outcomes. For example, the FOM may be a P1+b $P2^2$+c P3. In some embodiments, while iteratively performing the process, the predetermined weight assigned to at least one of the measurable outcomes is changed. This is schematically illustrated in FIG. 6, where the weight b used in FOM' is changed to b' in FOM''. For example, if it is determined that a first measurable outcome can shift to values outside the corresponding optimum range without a sufficient corresponding shift in the FOM, the weight assigned to the first measurable outcome can be increased. In some embodiments, the weight(s) are changed because the overall optimization goal has changed (e.g. higher performance and lower defect density vs. higher yield and lower performance).

The FOM can be defined such that a maximum value of the FOM is desired or can be defined such that a minimum value of the FOM is desired. In some embodiments, it is desired to maximize the figure of merit. In some such embodiments, the figure of merit is higher when each measurable outcome is in a corresponding optimum range, and lower when at least one measurable outcome is outside the corresponding optimum range. In some embodiments, it is desired to minimize the figure of merit. In some such embodiments, the figure of merit is lower when each measurable outcome is in a corresponding optimum range, and higher when at least one measurable outcome is outside the corresponding optimum range.

In some embodiments, the method can include dynamically and substantially seamlessly adding/dropping control signals and/or adding/dropping control values for an existing control signal (updating the search space) based on causal knowledge of their causal effects and changing operational constraints. In some embodiments, to run the method during a normal production process, for example, it may be desired to keep the operational range small (e.g., so that variations in control signals are more like perturbations than design of experiment variations). In some such embodiments, the optimum control signal values are often outside the initial range. In some embodiments, the method can iteratively adjust the operational range toward the optimum operational range.

Figure 7:
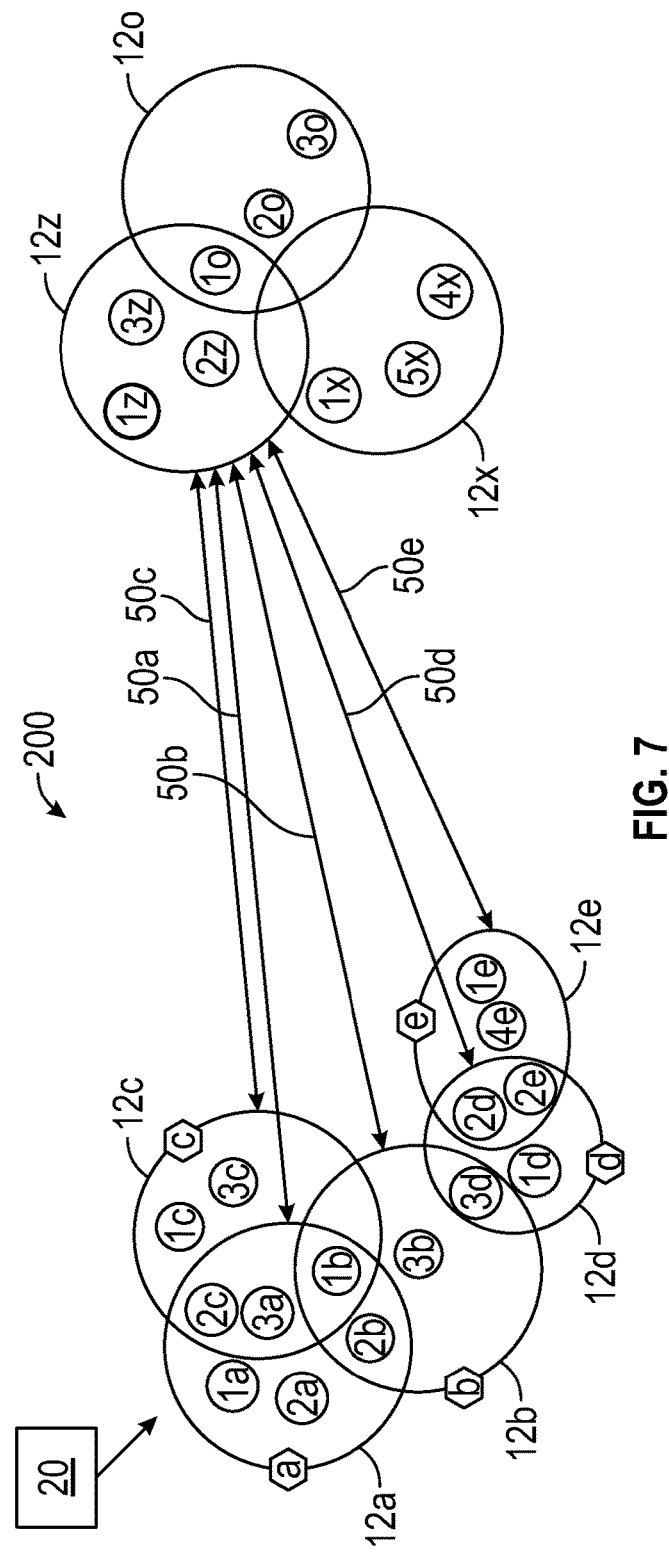
FIG. 7 is a schematic illustration of a method of determining control signals.

FIG. 7 is a schematic illustration of a method 200. In some embodiments, the method 200 is a method of performing a process (e.g., process 40) where the process uses a plurality of control signals (e.g., 1, 2, 3) and results in one or more measurable outcomes (e.g., P1-P3). In some embodiments, the method includes determining optimum values (e.g., $1o$, $2o$, $3o$) for the plurality of control signals by at least: receiving a set of operating constraints 20; generating expected optimum values (e.g., $1z$, $2z$, $3z$) within an expected optimum operational range $12z$ based on the received set of operating constraints; and iteratively (a-e) generating control signal values (e.g., $1a$-$e$, $2a$-$e$, $3a$-$e$) within corresponding operational ranges ($12a$-$e$), such that for at least one iteration (e.g., d), at least one of the control signal values (e.g., at least one of $1d$, $2d$, $3d$) is different than the corresponding control signal value (e.g., $1a$, $2a$, $3a$) in a previous iteration (e.g., a), and at least one (e.g., at least one of $1d$, $2d$), but not all, of the control signal values is outside the operational range (e.g., $12b$) in a previous iteration (e.g., b). The optimum values of the plurality of control signals may be within an optimum operational range $12o$ or within an optimized operational range $12x$. Generating the expected optimum values can include generating the expected optimum values such that the operating constraints are expected (e.g., based on knowledge available at the time the expected optimum values are generated) to be satisfied.

In some embodiments, the method 200 further includes receiving optimum ranges (e.g., PV1-PV3) for the one or more measurable outcomes (e.g., P1-P3), where the optimum ranges are expected to result from the control signals (e.g., 1, 2, 3) operating within the expected optimum operational range $12z$.

In some embodiments, the method 200 (e.g., the step of determining optimum values of the plurality of control signals) includes for each iteration, measuring values for the one or more measurable outcomes. In some embodiments, the method 200 (e.g., the step of determining optimum values of the plurality of control signals) further includes generating confidence intervals for the control signals to determine a causal relationship between the control signals and the measurable outcomes. For example, the method 200 may generate the confidence intervals C11-C13, C21-C23, C31-C33 schematically illustrated in FIGS. 8A-8C, which are confidence intervals for d-scores defined as a difference between a measurable outcome when the control signal value is selected randomly and when it is selected by probability matching, which is a measure of how much operational benefit that control signal variable delivers for that measurable outcome. As schematically illustrated in FIG. 9, the confidence intervals (e.g., C21) can change with operation iteration. This can occur due to increasing available data that can be used to determine the confidence intervals and/or due to changes in the value of the control signals. In some embodiments, the value of a control signal is not further modified after it has suitably converged to an optimum value. In some embodiments, while iteratively generating control signal values, a control signal (e.g., control signal 1) in the plurality of control signals is no longer modified when the confidence interval (e.g., C21) for the control signal corresponding to at least one of the one or more measurable outcomes (e.g., P2) is smaller than a predetermined confidence interval threshold (e.g., T21). For example, once the confidence interval, which represents the difference between the measurable outcome in baseline (random sampling of all possible values/levels) vs. exploit (consistently selecting the optimum value/level), is small, it may be desired to stop sampling the baseline and exploit 100% of the time.

In some embodiments, the method 200 includes performing the process using at least the control signals determined by the causal relationship to causally affect at least one of the one or more measurable outcomes. The values of the control signals used in this step can be the optimum values determined by the method 200.

In some embodiments, after a number of iterations (e.g., a-d), a control signal (e.g., control signal 3) in the plurality of control signals is eliminated (e.g., its value is no longer changed and/or it is no longer considered in computing confidence intervals) when performing further iterations (e.g., e). In some such embodiments, or in other embodiments, after a number of iterations (e.g., a-d), a new control signal (e.g., control signal 4) is included (e.g., its value was previously held fixed and is subsequently varied and/or it was previously not considered in computing confidence intervals and is subsequently utilized in computing confidence intervals) when performing further iterations (e.g., e). The new control signal can be a control signal in the plurality of control signals that was held at a fixed value until after the number of iterations. Similarly, the eliminated control signal can be a control signal in the plurality of control signals that was varied up to the number of iterations and then subsequently held at a fixed value. The number of iterations is a positive number that is typically sufficiently large for the method to have generated at least some knowledge of the causal effects of the control signals on the measurable outcomes. In some embodiments, at least one measurable outcome (e.g., P1) is measured while iteratively generating control signal values; and at least one other measurable outcome (e.g., P2) is measured after a completion of iteratively generating control signal values, as described further elsewhere.

The expected optimum operational range 12z may be generated based on prior knowledge of the process (e.g., based on an existing causal model established during a prior implementation of a method described herein) and/or based on the received set of operating constraints 20. For example, the expected optimum operational range 12z may be an operational range consistent with the received operating constraints that previously resulted in optimum, or at least desired, results. In some embodiments, while iteratively generating control signal values, at least one of the constraints in the set of operating constraints is modified. The expected optimum operational range 12z may be updated based on information generated by the method 200. In some embodiments, the method 200 further includes quantifying a gap (e.g., 50a-e) between the expected optimum operational range 12z and the operational range (e.g., 12a-e) in each iteration. For example, the gaps can be quantified in terms how rapidly control signal values vary (e.g., how often they change value, or how far are they from settling into an optimum value). This may be carried out analogously to Newton's method for determining a gap between a current estimate for a root and the estimate at the next iteration. For example, a figure of merit as a function of measurable outcomes can be defined such that the optimum value of the figure of merit is zero. The gap may then be quantified as the current value of the figure of merit divided by the change in the figure of merit from its value in the previous iteration. In some embodiments, the gap (e.g., 50c) for at least one iteration (e.g., iteration c) is smaller than the gap (e.g., 50a) for at least one previous iteration (e.g., iteration a).

In some embodiments, the optimum operational range 12o is different than the expected optimum operational range 12z. In some embodiments, after optimizing the control signals by determining the optimum values for the control signals, the optimized control signals (e.g., 1, 4, 5) operate within an optimized operational range 12x different than the optimum operational range 12o and the expected optimum operational range 12z. For example, the optimum operational range 12o may be an ideal operational range, while the optimized operational range 12x resulting from performing the method 200 may account for limitations such as non-ideal external variables (e.g., humidity too high) and can therefore differ from the optimum operational range 12o. In some embodiments, the expected optimum operational range 12z and the optimized operational range 12x differ (e.g., due to incomplete convergence). In some embodiments, the method 200 includes performing the process using at least the control signals determined by the causal relationship to causally affect at least one of the one or more measurable outcomes where the values of the control signals are the optimum values for the control signals operating within the optimized operational range 12x.

In some embodiments, the method 200 is a method of performing a process, the process using a plurality of control signals (e.g., 1, 2, 3) and resulting in one or more measurable outcomes (e.g., P1-P3). The method 200 can include determining an optimum operational range (e.g., optimum operational range 12o; or optimized operational range 12x) for the plurality control signals operating and having corresponding values (e.g., 1o, 2o, 3o; or 1x, 4x, 5x) in the optimum operational range (e.g., 12o or 12x) by at least: receiving a set of operating constraints 20; generating an expected optimum operational range 12z for the control signals based on the received set of operating constraints where the control signals are expected to operate and have corresponding values (e.g., 1z, 2z, 3z) in the expected optimum operational range; generating a first operational range (e.g., 12a) for the control signals operating and having corresponding values (e.g., 1a, 2a, 3a) in the first operational range; quantifying a first gap (e.g., 50a) between the first operational range (e.g., 12a) and the expected optimum operational range 12z;

and modifying at least one (e.g., at least one of 1*a*, 2*a*, 3*a*) of the control signals operating in the first operational range for to form a second operational range (e.g., 12*b*) for the control signals operating and having corresponding values (e.g., 1*b*, 2*b*, 3*b*) in the second operational range (e.g., 12*b*) so that at least one (e.g., 3*b*), but not all, of the control signal values is outside the first operational range, and a second gap (e.g., 50*b*) between the second operational range and the expected optimum operational range is less than the first gap. In some such embodiments, the optimum operational range 12*o* is different than the expected optimum operational range 12*z*. In some embodiments, determining the optimum operational range further includes: for each iteration, measuring values for the one or more measurable outcomes; and generating confidence intervals for the control signals to determine a causal relationship between the control signals and the measurable outcomes.

In some embodiments, the method 200 is performed iteratively (e.g., 12*a-e*) with the second operational range (e.g., 12*b*) determined in a first iteration being used as the first operational range for a next second iteration where the second iteration determines another second operational range (e.g., 12*c*). In some embodiments, the optimum control signal values may be outside the initial operational range and the method can iteratively adjust the operational range toward the optimum operational range. In some embodiments, the method 200 includes performing the process using at least the control signals determined by the causal relationship to causally affect at least one of the one or more measurable outcomes where the values of the control signals are the optimum control signal values determined by the method 200.

Figure 11:
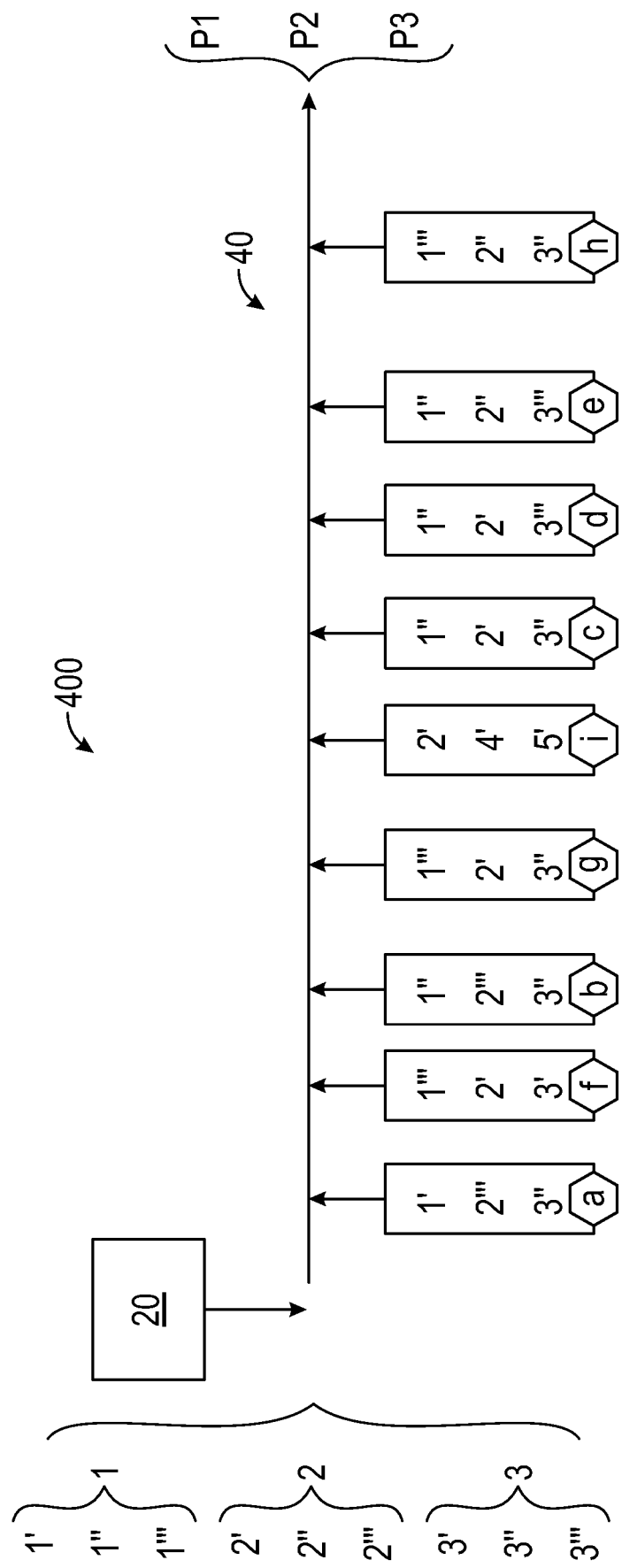

FIGS. 10-11 are schematic illustrations of methods 300 and 400 of performing a process 40 that uses a plurality of control signals (1-3) and results in a plurality of measurable outcomes (P1-P3). The methods 300 and 400 include optimizing the plurality of control signals by at least: for each control signal (e.g., 1), selecting a plurality of potential optimum values (e.g., 1', 1", 1''') from a predetermined set (e.g., 51) of potential optimum values (e.g., 1*a*-1*l*) for the control signal, and arranging the potential optimum values in a predetermined sequence; performing the process in at least a first sequence (a, b, c, d, e) of operation iterations, where for each pair of sequential first (e.g., a) and second (e.g., b) operation iterations in the first sequence of operation iterations, the potential optimum value (e.g., 1') of one selected (e.g., randomly selected, or otherwise selected, prior to the second operation iteration) control signal (e.g., 1) in the first operation iteration is replaced in the second operation iteration with the next potential optimum value (e.g., 1") of the selected control signal in the corresponding predetermined sequence of the potential optimum values, while the potential optimum values (e.g., 2''', 3") of the remaining control signals (e.g., 2, 3) in the first operation iteration are maintained in the second operation iteration. In some embodiments, for each control signal, the potential optimum values are randomly selected from the predetermined set of potential optimum values for the control signal. Optimizing the plurality of control signals can further include: for each operation iteration in at least the first sequence of operation iterations, measuring each outcome in the plurality of measurable outcomes; and generating confidence intervals for the control signals to determine causal relationships between the control signals and the measurable outcomes. In some embodiments, the method 300 or 400 includes performing the process using at least the control signals determined by the causal relationship to causally affect at least one of the measurable outcomes. For example, operation h in FIGS. 10-11 may schematically represent this step. The values of the control signals can be optimum values determined by the method 300 or 400.

In some embodiments, the potential optimum values (e.g., the predetermined set of potential optimum values or the plurality of values selected from the set) can be selected to optimize learning (e.g., explore values that have not been explored much in the past and hence have wide confidence intervals) or to optimize overall performance (e.g., exploit values with higher expected utility as determined by the overlap between the confidence intervals).

In some embodiments, the operation iterations in the first sequence are carried out consecutively (one iteration in the first sequence immediately after another iteration in the first sequence), and in other embodiments, the operation iterations in the first sequence are not carried consecutively (e.g., iterations from a different second sequence can be carried out between iterations in the first sequence).

In some embodiments, performing the process in at least the first sequence of operation iterations, further includes performing the process in a second sequence (f, g, h) of operation iterations, where for each pair of sequential first (e.g., f) and second (e.g., g) operation iterations in the second sequence of operation iterations, the potential optimum value (e.g., 3') of one selected (e.g., randomly selected or otherwise selected) control signal (e.g., 3) in the first operation iteration is replaced in the second operation iteration with the next potential optimum value (e.g., 3") of the selected control signal in the corresponding predetermined sequence of the potential optimum values, while the potential optimum values of the remaining control signals (e.g., 1, 2) in the first operation iteration are maintained in the second operation iteration. In some embodiments, as illustrated in FIG. 11, at least one operation iteration (e.g., f) in the second sequence of operation iterations is performed between two operation iterations (e.g., a, b) in the first sequence of operation iterations. In some embodiments, as illustrated in FIG. 10, the second sequence of operation iterations (f, g, h) is performed after the first sequence of operation iterations (a, b, c, d, e). In some embodiments, performing the process in at least the first sequence of operation iterations further includes performing the process for at least one operation iteration not in the first sequence of operation iterations (e.g., operation iteration i depicted in FIG. 11 or any of the operation iterations in the second sequence that is not in the first sequence). The at least one operation iteration not in the first sequence of operation iterations can use control signals different from those used in the first sequence of operation iterations. For example, operation iteration i depicted in FIG. 11 uses control signals 4 and 5 taking the values 4' and 5'.

In some embodiments, while performing the process, for at least one control signal, the selected plurality of potential optimum values is changed. This is schematically illustrated in FIG. 10 where after process iteration e begins and before process iteration f begins, the plurality of potential optimum values of control signal 1 is changed to 1", 1'''. and 1''''. In some embodiments, the changed potential optimum values are selected from a subset of the predetermined set of potential optimum values for the control signal, where the subset is selected based, at least in part, on stored values of the measurable outcomes and/or on stored values of the confidence intervals. For example, the predetermined set may be the set 51 depicted in FIG. 3A, and the subset 51' may be the values (1*e*, 1*f*, 1*g*, 1*h*, 1*i*) as schematically illustrated in FIG. 12. In some embodiments, the changed potential optimum values are randomly selected from the subset. In some embodiments, based on measurements of each measurable outcome in the plurality of measurable outcomes, a potential optimum value (e.g., 1') of a control signal is replaced with another potential optimum value (e.g., 1'''') from the predetermined set of potential optimum values for the control signal. In some embodiments, a potential optimum value (e.g., 1') of a control signal is replaced with a new potential optimum value that is obtained by interpolation between two previous potential optimum values. The causal learning for the new value can be initialized by determining an initial d-score for the new value by averaging the d-scores of the two previous potential optimum values (or utilizing a regression technique to obtain the d-score for the new value), for example.

In some embodiments, at least one operation iteration in the first sequence of operation iterations is carried out for a duration different from that of at least one other operation iteration. For example, process iteration b may be carried out for a duration d1 and process iteration c may be carried out for a duration d2, where d1>d2 as schematically illustrated in FIG. 10. In some embodiments, a duration of at least one later operation iteration (e.g., c) is determined based, at least in part, on measurable outcomes measured in at least one earlier operation iteration (e.g., b) and/or on confidence intervals and/or the gap between the operational range and the expected optimum operational range.

In some embodiments, the potential optimum value (e.g., 1') of a selected control signal (e.g., 1) in a first operation iteration is replaced in a second operation iteration with the next potential optimum value (e.g., 1'') of the selected control signal in a corresponding predetermined sequence of the potential optimum values, while values of the remaining control signals are maintained. In some embodiments, the selected control signal is randomly selected from the plurality of control signals. In some embodiments, the selected control signal is randomly selected based on a distribution of the control signals in the plurality of control signals. FIGS. 13A-13C schematically illustrate three possible distributions 53, 53', and 53''. Distribution 53 assigns an equal weight to each control signal so that when the control signal is selected based on the distribution 53, each control signal is equally likely to be selected. Distribution 53' assigns a higher weight to control signal 2 and lower weights to control signals 1 and 3 so that when the control signal is selected based on the distribution 53', control signal 2 is more likely to be selected than the other control signals. This may be desired if the method determines that control signal 2 is more important than the other control signals in determining a desired measurable output or if the confidence intervals for the other control signals are below a threshold, for example. In some embodiments, while performing the process, the distribution is modified (e.g., from 53 to 53'). In some embodiments, for at least one operation iteration, the selected control signal is selected from a subset (e.g., the subset 1, 2) of the plurality of control signals. For example, the distribution 53'' schematically illustrated in FIG. 13C may be used, which assigns a zero probability to control signal 3 so that a control signal selected based on the distribution 53'' is selected from the subset (1, 2). In some embodiments, the subset is selected based, at least in part, on the measurable outcomes measured in a previous operation iteration and/or on confidence intervals. In some embodiments, the selected control signal is randomly selected from the subset.

In some embodiments, the method includes arranging the potential optimum values (e.g., 1', 1'', 1''') in a predetermined sequence (e.g., 1', 1'', 1''') The predetermined sequence may be ordered to facilitate d-score calculations (e.g., to maximize the likelihood of being able to compute a d-score with each iteration). The sequence may continue in reverse after the last potential optimum value is reached (e.g., the sequence may be 1', 1'', 1''', 1'', 1', 1'', . . . ), so that for each potential optimum value, the next potential optimum value is defined and can be close (e.g., differing by one unit) to the potential optimum value.

Figure 14:
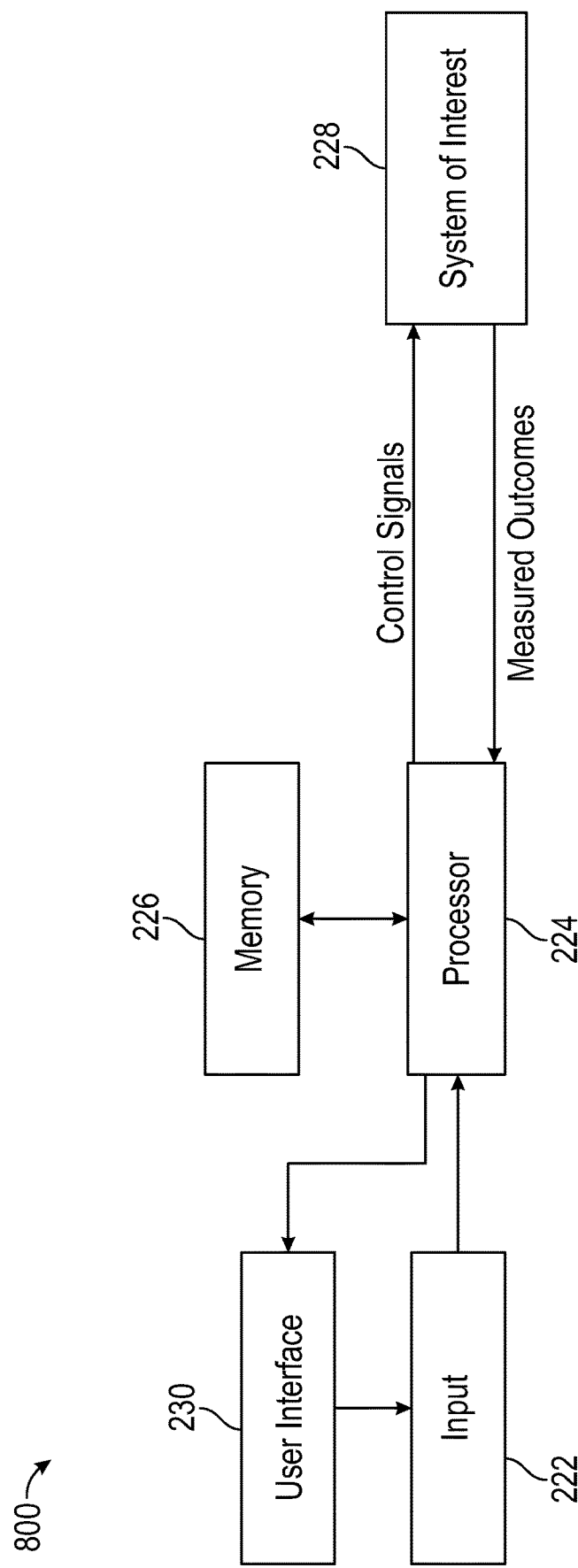
FIG. 14 is a schematic illustration of a system.

FIG. 14 is a schematic illustration of a system 800 for carrying out methods of the present description according to some embodiments. System 800 includes a processor 224 and memory 226. Input 222 (e.g., constraints, potential optimum values of control signals, optimum ranges of measurable outcomes) may be provided through user interface 230, received by the processor 224, and stored in memory 226. The system of interest 228 (e.g., a manufacturing line or any system that carries out a process controlled by controlled signals) receives control signals (e.g., for controlling line speed or oven temperature) and provides measured outcomes (e.g., performance attributes or defect density of articles made on the manufacturing line) to the processor 224. The processor 224 may iteratively update the control signals and receive updated measured outcomes. The processor 224 may store the control signals and the measured outcomes in the memory 226. The processor 224 may compute confidence intervals to determine a causal relationship between the control signals and the measurable outcomes and/or between the control signals and a figure of merit. In some embodiments, a method of the present description includes providing memory 226 and a processor 224 coupled to the memory 226, where the processor 224 is configured to: store in the memory 226, for each process iteration, values of the control signals and the measured outcomes; and compute the confidence intervals from the stored values of the control signals and the measured outcomes. In some embodiments, the resulting confidence intervals are provided to an operator or user through user interface 230.

The following is a list of exemplary embodiments of the present description.

A first embodiments is a method of performing a process, the process using a plurality of control signals and resulting in a plurality of measurable outcomes, the method comprising: optimizing the plurality of control signals by at least:
receiving a plurality of process constraints;
receiving, for each measurable outcome, an optimum range;
receiving, for each control signal, a plurality of potential optimum values;
iteratively performing the process, wherein for each process iteration, the value of each control signal is selected from among the plurality of potential optimum values received for the control signal;
for each process iteration, measuring each outcome in the plurality of measurable outcomes; and
generating confidence intervals for the control signals to determine a causal relationship between the control signals and the measurable outcomes; and performing the process using at least the control signals determined by the causal relationship to causally affect at least one of the measurable outcomes.

A second embodiment is the method of the first embodiment, wherein: at least one measurable outcome is measured while iteratively performing the process; and at least one other measurable outcome is measured after a completion of iteratively performing the process.

A third embodiment is the method of the first or second embodiments, wherein generating the confidence intervals for the control signals comprises generating a confidence interval for each potential optimum value of each control signal to determine a causal relationship between the potential optimum value of the control signal and each measurable outcome.

A fourth embodiment is the method of the third embodiment, wherein each confidence interval comprises upper and lower bounds, and wherein if for a control signal in the plurality of control signals, the confidence intervals for the potential optimum values of the control signal are non-overlapping, then an optimum value for the control signal is selected as the potential optimum value of the control signal that corresponds to the confidence interval having the highest lower bound.

A fifth embodiment is the method of the third embodiment, wherein each confidence interval comprises upper and lower bounds, and wherein if for a control signal in the plurality of control signals, the confidence intervals for the potential optimum values of the control signal are non-overlapping, then an optimum value for the control signal is selected as the potential optimum value of the control signal that corresponds to the confidence interval having the lowest higher bound.

A sixth embodiment is the method of any one of the third through fifth embodiments, wherein if for a control signal in the plurality of control signals, the confidence intervals for the potential optimum values of the control signal are overlapping, then an optimum value for the control signal is selected by Thompson sampling or probability matching from the potential optimum value of the control signal.

A seventh embodiment is a method of performing a process, the process using a plurality of control signals and resulting in one or more measurable outcomes, the method comprising: determining optimum values for the plurality of control signals by at least:
  receiving a set of operating constraints;
  generating expected optimum values within an expected optimum operational range based on the received set of operating constraints;
  iteratively generating control signal values within corresponding operational ranges, such that for at least one iteration, at least one of the control signal values is different than the corresponding control signal value in a previous iteration, and at least one, but not all, of the control signal values is outside the operational range in a previous iteration;
  for each iteration, measuring values for the one or more measurable outcomes; and
  generating confidence intervals for the control signals to determine a causal relationship between the control signals and the one or more measurable outcomes; and
  performing the process using the optimum values of at least the control signals determined by the causal relationship to causally affect at least one of the one or more measurable outcomes.

An eighth embodiment is the method of the seventh embodiment further comprising: receiving optimum ranges for the one or more measurable outcomes, the optimum ranges expected to result from the control signals operating within the expected optimum operational range.

A ninth embodiment is the method of the seventh or eighth embodiments, wherein while iteratively generating control signal values, a control signal in the plurality of control signals is no longer modified when the confidence interval for the control signal corresponding to at least one of the one or more measurable outcomes is smaller than a predetermined confidence interval threshold.

A tenth embodiment is the method of any one of the seventh through ninth embodiments, wherein after a number of iterations, a control signal in the plurality of control signals is eliminated when performing further iterations, or a new control signal is included when performing further iterations.

An eleventh embodiment is a method of performing a process, the process using a plurality of control signals and resulting in one or more measurable outcomes, the method comprising: determining an optimum operational range for the plurality control signals operating and having corresponding values in the optimum operational range by at least:
  receiving a set of operating constraints;
  generating an expected optimum operational range for the control signals based on the received set of operating constraints, the control signals expected to operate and have corresponding values in the expected optimum operational range;
  generating a first operational range for the control signals operating and having corresponding values in the first operational range;
  quantifying a first gap between the first operational range and the expected optimum operational range; modifying at least one of the control signals operating in the first operational range to form a second operational range for the control signals operating and having corresponding values in the second operational range so that at least one, but not all, of the control signal values is outside the first operational range, and a second gap between the second operational range and the expected optimum operational range is less than the first gap; and
  generating confidence intervals for the control signals to determine a causal relationship between the control signals and the one or more measurable outcomes; and
  performing the process using at least the control signals determined by the causal relationship to causally affect at least one of the one or more measurable outcomes.

A twelfth embodiment is a method of performing a process, the process using a plurality of control signals and resulting in a plurality of measurable outcomes, the method comprising: optimizing the plurality of control signals by at least:
  for each control signal, selecting a plurality of potential optimum values from a predetermined set of potential optimum values for the control signal, and arranging the potential optimum values in a predetermined sequence;
  performing the process in at least a first sequence of operation iterations, wherein for each pair of sequential first and second operation iterations in the first sequence of operation iterations, the potential optimum value of one selected control signal in the first operation iteration is replaced in the second operation iteration with the next potential optimum value of the selected control signal in the corresponding predetermined sequence of the potential optimum values, while the potential optimum values of the remaining control signals in the first operation iteration are maintained in the second operation iteration;
  for each operation iteration in at least the first sequence of operation iterations, measuring each outcome in the plurality of measurable outcomes; and generating confidence intervals for the control signals to determine causal relationships between the control signals and the measurable outcomes; and performing the process using at least the control signals determined by the causal relationship to causally affect at least one of the measurable outcomes.

A thirteenth embodiment is the method of the twelfth embodiment, wherein performing the process in at least the first sequence of operation iterations, further comprises performing the process in a second sequence of operation iterations, wherein for each pair of sequential first and second operation iterations in the second sequence of operation iterations, the potential optimum value of one selected control signal in the first operation iteration is replaced in the second operation iteration with the next potential optimum value of the selected control signal in the corresponding predetermined sequence of the potential optimum values, while the potential optimum values of the remaining control signals in the first operation iteration are maintained in the second operation iteration.

A fourteenth embodiment is the method of the thirteenth embodiment, wherein at least one operation iteration in the second sequence of operation iterations is performed between two operation iterations in the first sequence of operation iterations.

A fifteenth embodiment is the method of the thirteenth or fourteenth embodiments, wherein at least one operation iteration in the first sequence of operation iterations is carried out for a duration different from that of at least one other operation iteration in the first sequence of operation iterations.

EXAMPLES

Example 1

A process of biaxially stretching polyethylene terephthalate (PET) film in a tenter frame was controlled by differences in positions of rails. Control signal A1 controlled the position of a second rail relative to a first rail at a first location and was selected from the potential optimum values −1 and 0. Control signal A2 controlled the position of the second rail relative to the first rail and at a second location was selected from the potential optimum values −4, −3, −2, 0, 2, and 4. A quantity that can be characterized as a defect density was used to define a figure of merit (FOM). It was desired to minimize the FOM. The potential optimum values were expected to result in process constraints being satisfied (e.g., the rail positions being such that the film did not tear) and the FOM was expected to be in an optimum range of 0 to 0.05. The film temperature was also measured. However, control signals for controlling the oven temperature were not varied in this particular example.

A method of optimizing the control signals A1 and A2 was carried out where the control signals were selected from the corresponding potential optimum values in each operation iteration of the process and where the FOM and the film temperature were measured for each operation iteration. To compute d-scores, first a control variable (e.g. A1) was selected, then two subsets of experiments that differed by 1 unit/level for that control variable (e.g. subset A1=−1 and subset A1=0) but were the same for the other control variable (e.g. A2=0) was selected. Propensity score matching based on the time when the experiments were conducted and on the measured film temperatures was then used to identify most similar experiment pairs, and the difference in figure of merit for each pair (a d-score) was computed. This process was repeated for all possible values of the control variables, and D-scores were aggregated as one distribution representing a repeated measure of the effect of changing the control variable (e.g., changing A1 from value −1 to value 0 (A1: −1→0)) on the figure of merit. To generate an estimate of the expected mean effect and determine whether this effect was statistically significant, a 95% confidence interval was calculated by conducting a single sample t-test on that d-score distribution. The resulting expected change in the FOM and confidence intervals bounds (95% confidence intervals) are reported in the table below.

| Change in A1, A2 | Expected Change in FOM | Confidence Interval Lower Bound | Confidence Interval Upper Bound |
|---|---|---|---|
| A1: −1 → 0 | −0.005 | −0.007 | −0.003 |
| A2: −4 → −3 | −0.015 | −0.017 | −0.013 |
| A2: −3 → −2 | −0.046 | −0.049 | −0.043 |
| A2: −2 → 0 | 0.0015 | 0.002 | 0.005 |
| A2: 0 → 2 | 0.025 | 0.023 | 0.025 |
| A2: 2 → 4 | 0.0475 | 0.049 | 0.046 |

From the d-scores for changes in the control signals by one unit/level, d-scores and confidence intervals were computed for each level relative to the average of all other levels. The results are provided in the following tables.

| A1 | Effect on FOM Relative to Average | Confidence Interval Lower Bound | Confidence Interval Upper Bound |
|---|---|---|---|
| −1 | 0.005 | 0.003 | 0.007 |
| 0 | −0.005 | −0.007 | −0.003 |

| A2 | Effect on FOM Relative to Average | Confidence Interval Lower Bound | Confidence Interval Upper Bound |
|---|---|---|---|
| −4 | 0.031 | 0.028 | 0.034 |
| −3 | 0.013 | 0.011 | 0.015 |
| −2 | −0.0415 | −0.044 | −0.039 |
| 0 | −0.040 | −0.0425 | −0.0375 |
| 2 | −0.01 | −0.012 | −0.008 |
| 4 | 0.047 | 0.045 | 0.049 |

From this is was concluded that the optimum control signal values were A1=0 and A2=−2.

Example 2

A process for making retroreflective film in a cast and cure process was controlled as follows. Process constraints were that the cast resin was sufficiently cured and that the line speed was no less than a minimum speed Smin and no greater than a maximum speed Smax. Control signal 1 controlled the power level of precure ultraviolet (UV) lamps and had potential optimum values corresponding to power levels of P1, P2, and P3, with P1<P2<P3. Control signal 2 controlled the power level of post-cure UV lamps and had potential optimum values corresponding to power levels of P4, P5, and P6, with P4<P5<P6. Control signal 3 controlled the line speed and had potential optimum values corresponding to Smin and Smax. The potential optimum values of the control signals were expected to result in the process constraints being satisfied. The measurable outcomes were retroreflectance (reflected brightness normalized by an average brightness and expressed as a percent) determined in each of 8 lane positions. An optimum range for each retroreflectance (Ri) was that the retroreflectance was no less than a specified minimum value Rmin (i.e., Ri≥Rmin). The mean of the retroreflectance measured in the 8 lane positions was used as a figure of merit (FOM). An additional quantity that could have been included in a figure of merit is a standard deviation of the retroreflectance measured in the 8 lane positions (e.g., another suitable figure of merit could have been the mean minus the standard deviation of the retroreflectance metric). A series of 60 process iterations were carried out where values of the control signals were selected from among the potential optimum values and the values of the retroreflectance were measured for each iteration. D-scores and confidence intervals were produced from the resulting data in a similar manner as described for Example 1. The confidence intervals (95% confidence level) for the control signals for the FOM is provided in the following tables.

| Control Signal 1 (precure UV lamps) | Effect on FOM Relative to Average | Confidence Interval Lower Bound | Confidence Interval Upper Bound |
|---|---|---|---|
| P1 | 3.3% | 1.1% | 5.6% |
| P2 | −1.1% | −3.3% | 1.1% |
| P3 | −2.2% | −4.4% | 0.0% |

| Control Signal 2 (post-cure UV lamps) | Effect on FOM Relative to Average | Confidence Interval Lower Bound | Confidence Interval Upper Bound |
|---|---|---|---|
| P4 | 1.1% | −1.6% | 3.8% |
| P5 | −1.3% | −4.0% | 1.3% |
| P6 | 0.2% | −2.4% | 2.9% |

| Control Signal 3 (line speed) | Effect on FOM Relative to Average | Confidence Interval Lower Bound | Confidence Interval Upper Bound |
|---|---|---|---|
| Smin | 6.7% | 4.4% | 8.9% |
| Smax | −6.7% | −8.9% | −4.4% |

From these results, it was concluded that the line speed and the precure UV lamps were the strongest drivers with a line speed of Smin and precure UV lamp power setting of P1 resulting in a higher FOM relative to other settings. It was found that by optimizing the curing profile/power, it was possible to increase the retroreflectance and trade any excess retroreflectance above Rmin for increased line speed above Smin, resulting in greater capacity and productivity.

Example 3

Figure 15:
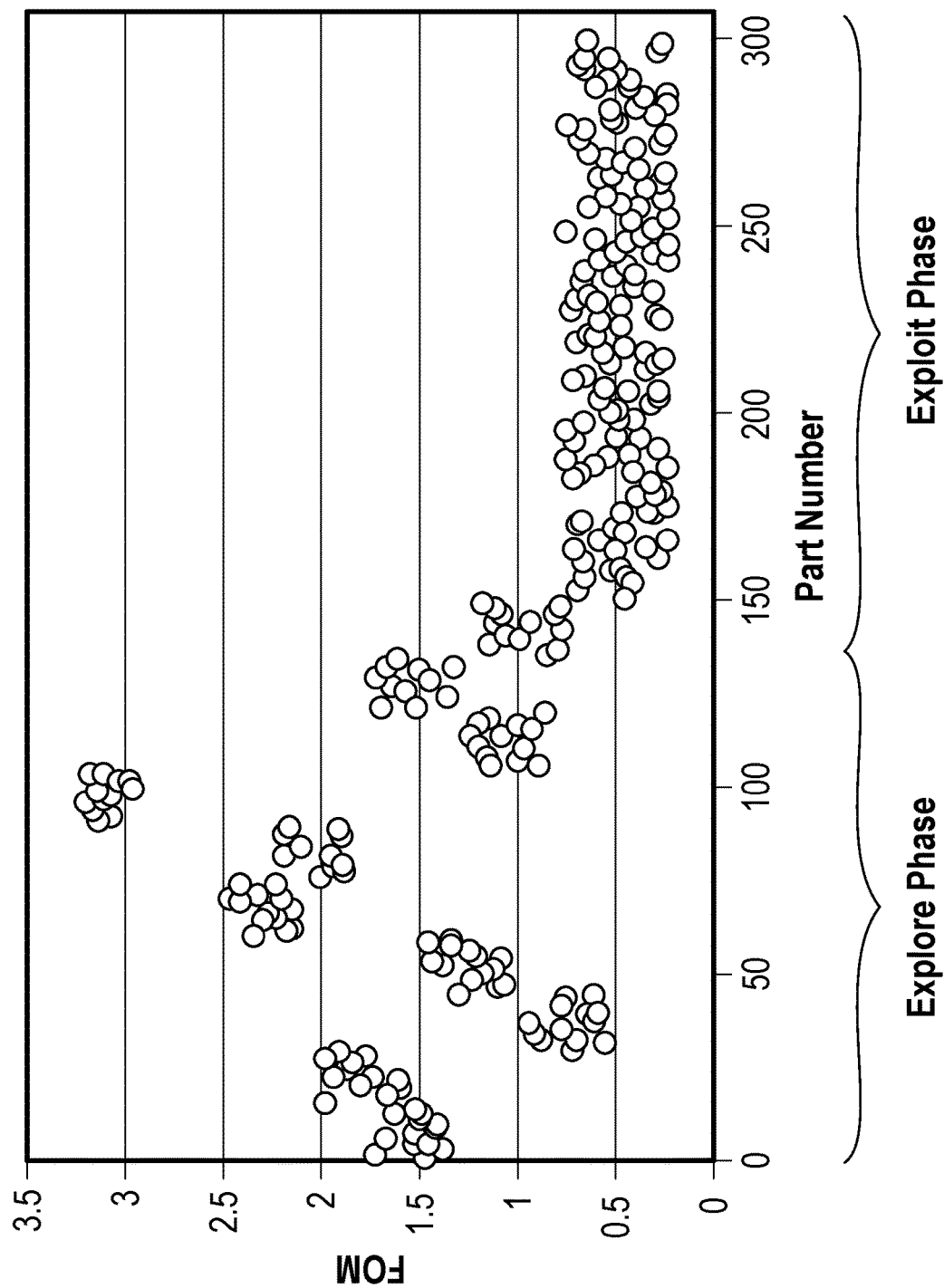
FIG. 15 is a plot of a figure of merit determined in a method of optimizing control signals used in performing a process.

A computer simulation of controlling a process for making sintered parts by additive manufacturing was performed as follows. Process constraints were for the final parts to meet a number of product specifications, including porosity, shape accuracy, and performance tests. Control signal 1 controlled the input material formulation, which was modeled as a two-part mixture containing X % of part A and (1−X) % of part B, and had potential optimum values corresponding to volume fractions of 40%, 50%, and 60%. Control signal 2 was a 3D scale factor that compensated for the reduction in size during the sintering process and had potential optimum values corresponding to scale factors of 1.2, 1.25, and 1.3. Control signal 3 controlled the furnace temperature profile for heating and cooling the printed "green" parts during the sintering process and had potential optimum values corresponding to three different temperature profiles. The potential optimum values of the control signals were expected to result in the process constraints being satisfied. The measurable outcomes were final part porosity (inferred by calculating the volume and mass of each part) and maximum dimensional error (defined as the maximum difference in width, length and height of each part relative to the target specifications). An optimum range for each measurable outcome was for the porosity to be greater than a minimum value Pmin and for the maximum dimensional error to be below Emax. Typical values of Pmin and Emax can be 25% and 200 micrometers, respectively. However, the computational model utilized a normalization such that specific values of Pmin and Emax were not needed to determine the figure of merit defined below. A series of 20 process iterations, each consisting of a batch of 15 parts, were simulated where values of the control signals were selected from among the potential optimum values and the values of the porosity and maximum dimensional error were determined for each iteration. To facilitate process optimization, the hard constraints on the measurable outcomes were converted to soft constraint functions and aggregated into a single figure of merit function as follows: FOM=exp(E/Emax)+exp(max(0,Pmin−P)/Pmin), where E is the maximum dimensional error and P is the porosity determined for each part. The goal of the optimization was to minimize the figure of merit. D-scores and 95% confidence intervals were produced and used to drive process optimization. FIG. 15 shows the evolution of the figure of merit after producing 20 batches of 15 parts (300 parts total) in the simulation, where each batch was subject to one set of control signal values. An explore phase where the control signals were varied to determine optimum values and an exploit phase where the control signal value were consistently selected from the resulting optimum values is indicated in the figure.

All references, patents, and patent applications referenced in the foregoing are hereby incorporated herein by reference in their entirety in a consistent manner. In the event of inconsistencies or contradictions between portions of the incorporated references and this application, the information in the preceding description shall control.

Descriptions for elements in figures should be understood to apply equally to corresponding elements in other figures, unless indicated otherwise. Although specific embodiments have been illustrated and described herein, it will be appreciated by those of ordinary skill in the art that a variety of alternate and/or equivalent implementations can be substituted for the specific embodiments shown and described without departing from the scope of the present disclosure. This application is intended to cover any adaptations or variations of the specific embodiments discussed herein. Therefore, it is intended that this disclosure be limited only by the claims and the equivalents thereof.

What is claimed is:

1. A method of performing a process, the process using a plurality of control signals and resulting in a plurality of measurable outcomes, the method comprising:

optimizing the plurality of control signals by at least:
  receiving a plurality of process constraints;
  receiving, for each measurable outcome, an optimum range;
  receiving, for each control signal, a plurality of potential optimum values;
  iteratively performing the process, wherein for each process iteration, the value of each control signal is selected from among the plurality of potential optimum values received for the plurality of control signals;
  for the each process iteration, measuring each outcome in the plurality of measurable outcomes;
  generating confidence intervals for the plurality of control signals to determine a causal relationship between the plurality of control signals and the plurality of the measurable outcomes; and
performing the process using at least the plurality of control signals determined by the causal relationship to causally affect at least one of the plurality of the measurable outcomes, wherein the causal relationship is maintained and updated by repeatedly selecting different values for ty of control signals and measuring effects of the different values on the plurality of the measurable outcomes of the process,
wherein causation is measured as a difference in the plurality of measurable outcomes associated with changing a control signal while keeping all other control signals constant and blocking external variables known or suspected to covary with the measurable outcomes, and
wherein differences in measurable outcomes are used to quantify an estimate of a causal effect of the change in the control signal and the uncertainty surrounding the estimate and represents a degree of inference precision.

2. The method of claim 1, wherein:
at least one measurable outcome is measured while iteratively performing the process; and
at least one other measurable outcome is measured after a completion of iteratively performing the process.

3. The method of claim 1, wherein generating the confidence intervals for the plurality of control signals comprises generating a confidence interval for each potential optimum value of each control signal to determine a causal relationship between the potential optimum value of the control signal and each measurable outcome.

4. The method of claim 3, wherein each confidence interval comprises upper and lower bounds, and wherein if for a control signal in the plurality of control signals, the confidence intervals for the potential optimum values of the control signal are non-overlapping, then an optimum value for the control signal is selected as the potential optimum value of the control signal that corresponds to the confidence interval having the highest lower bound.

5. The method of claim 3, wherein each confidence interval comprises upper and lower bounds, and wherein if for a control signal in the plurality of control signals, the confidence intervals for the potential optimum values of the control signal are non-overlapping, then an optimum value for the control signal is selected as the potential optimum value of the control signal that corresponds to the confidence interval having the lowest higher bound.

6. The method of claim 3, wherein if for a control signal in the plurality of control signals, the confidence intervals for the potential optimum values of the control signal are overlapping, then an optimum value for the control signal is selected by Thompson sampling or probability matching from the potential optimum value of the control signal.

7. A method of performing a process, the process using a plurality of control signals and resulting in one or more measurable outcomes, the method comprising:
determining optimum values for the plurality of control signals by at least:
  receiving a set of operating constraints;
  generating expected optimum values within an expected optimum operational range based on the received set of operating constraints;
  iteratively generating control signal values within corresponding operational ranges, such that for at least one iteration, at least one of the control signal values is different than the corresponding control signal value in a previous iteration, and at least one, but not all, of the control signal values is outside the operational range in a previous iteration;
  for each iteration, measuring values for the one or more measurable outcomes; and
  generating confidence intervals for the plurality of control signals to determine a causal relationship between the plurality of control signals and the one or more measurable outcomes; and
performing the process using the optimum values of at least the plurality of control signals determined by the causal relationship to causally affect at least one of the one or more measurable outcomes, wherein the causal relaionship is maintained and updated by repeatedly selecting different values for the plurality of control signals and measuring effects of the different values on the one or more measurable outcomes of the process,
wherein causation is measured as a difference in one or more measurable outcomes associated with changing a control signal of the plurality of control signals while keeping all other control signals constant and blocking external variables known or suspected to covary with the one or more measurable outcomes, and
wherein differences in the one or more measurable outcomes are used to quantify an estimate of a causal effect of the change in the control signal of the plurality of control signals and the uncertainty surrounding it and represents a measure or degree of inference precision.

8. The method of claim 7 further comprising receiving optimum ranges for the one or more measurable outcomes, the optimum ranges expected to result from the plurality of control signals operating within the expected optimum operational range.

9. The method of claim 7, wherein while iteratively generating control signal values, a control signal in the plurality of control signals is no longer modified when the confidence interval for the control signal corresponding to at least one of the one or more measurable outcomes is smaller than a predetermined confidence interval threshold.

10. The method of claim 7, wherein after a number of iterations, a control signal in the plurality of control signals is eliminated when performing further iterations, or a new control signal is included when performing further iterations.

11. A method of performing a process, the process using a plurality of control signals and resulting in one or more measurable outcomes, the method comprising:
determining an optimum operational range for the plurality control signals operating and having corresponding values in the optimum operational range by at least:
  receiving a set of operating constraints;

generating an expected optimum operational range for the plurality of control signals based on the received set of operating constraints, the plurality of control signals expected to operate and have corresponding values in the expected optimum operational range;

generating a first operational range for the plurality of control signals operating and having corresponding values in the first operational range;

quantifying a first gap between the first operational range and the expected optimum operational range;

modifying at least one of the plurality of control signals operating in the first operational range to form a second operational range for the plurality of control signals operating and having corresponding values in the second operational range so that at least one, but not all, of control signal values is outside the first operational range, and a second gap between the second operational range and the expected optimum operational range is less than the first gap;

generating confidence intervals for the plurality of control signals to determine a causal relationship between the plurality of control signals and the one or more measurable outcomes; and performing the process using at least the control signals determined by the causal relationship to causally affect at least one of the one or more measurable outcomes, wherein the causal relationship is maintained and updated by repeatedly selecting different values for control signals and measuring effects of the different values on the one or more measurable outcomes of the process, wherein causation is measured as a difference in measurable outcomes associated with changing a control signal while keeping all other control signals constant and blocking external variables known or suspected to covary with the one or more measurable outcomes, and wherein differences in measurable outcomes are used to quantify an estimate of a causal effect of the change in the control signal and the uncertainty surrounding it and represents a measure or degree of inference precision.

12. A method of performing a process, the process using a plurality of control signals and resulting in a plurality of measurable outcomes, the method comprising:

optimizing the plurality of control signals by at least:

for each control signal, selecting a plurality of potential optimum values from a predetermined set of potential optimum values for the each control signal, and arranging the potential optimum values in a predetermined sequence;

performing the process in at least a first sequence of operation iterations, wherein for each pair of sequential first and second operation iterations in the first sequence of operation iterations, the potential optimum value of one selected control signal in the first operation iteration is replaced in the second operation iteration with the next potential optimum value of the one selected control signal in the corresponding predetermined sequence of the potential optimum values, while the potential optimum values of the remaining control signals in the first operation iteration are maintained in the second operation iteration;

for each operation iteration in at least the first sequence of operation iterations, measuring each outcome in the plurality of measurable outcomes and blocking external variables known or suspected to covary with the measurable outcomes;

generating confidence intervals for the plurality of control signals to determine causal relationships between the plurality of control signals and the plurality of measurable outcomes; and performing the process using at least the plurality of control signals determined by the causal relationships to causally affect at least one of the plurality of measurable outcomes, wherein the causal relationships are maintained and updated by repeatedly selecting different values for the plurality of control signals and measuring effects of the different values on the plurality of measurable outcomes of the process, wherein causation is measured as a difference in measurable outcomes associated with changing a control signal while keeping all other control signals constant, and wherein differences in measurable outcomes are used to quantify an estimate of a causal effect of the change in the control signal and the uncertainty surrounding it and represents a measure or degree of inference precision.

13. The method of claim 12, wherein performing the process in at least the first sequence of operation iterations, further comprises performing the process in a second sequence of operation iterations, wherein for each pair of sequential first and second operation iterations in the second sequence of operation iterations, the potential optimum value of one selected control signal in the first operation iteration is replaced in the second operation iteration with the next potential optimum value of the selected control signal in the corresponding predetermined sequence of the potential optimum values, while the potential optimum values of the remaining control signals in the first operation iteration are maintained in the second operation iteration.

14. The method of claim 13, wherein at least one operation iteration in the second sequence of operation iterations is performed between two operation iterations in the first sequence of operation iterations.

15. The method of claim 12, wherein at least one operation iteration in the first sequence of operation iterations is carried out for a duration different from that of at least one other operation iteration in the first sequence of operation iterations.

* * * * *